(12) United States Patent
Schwarz et al.

(10) Patent No.: US 12,108,041 B2
(45) Date of Patent: Oct. 1, 2024

(54) DECODER, ENCODER AND METHOD FOR SUPPORTING ADAPTIVE DEPENDENT QUANTIZATION OF TRANSFORM COEFFICIENT LEVELS

(71) Applicant: Fraunhofer-Gesellschaft zur Foerderung der angewandten Forschung e.V., Munich (DE)

(72) Inventors: Heiko Schwarz, Berlin (DE); Soenke Schmidt, Berlin (DE); Paul Haase, Berlin (DE); Phan Hoang Tung Nguyen, Berlin (DE); Detlev Marpe, Berlin (DE); Thomas Wiegand, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 144 days.

(21) Appl. No.: 17/839,216

(22) Filed: Jun. 13, 2022

(65) Prior Publication Data
US 2022/0321886 A1 Oct. 6, 2022

Related U.S. Application Data

(63) Continuation of application No. PCT/EP2020/087146, filed on Dec. 18, 2020.

(30) Foreign Application Priority Data

Dec. 20, 2019 (EP) .................................... 19218785

(51) Int. Cl.
*H04N 19/124* (2014.01)
*H04N 19/105* (2014.01)
(Continued)

(52) U.S. Cl.
CPC ......... *H04N 19/124* (2014.11); *H04N 19/105* (2014.11); *H04N 19/13* (2014.11);
(Continued)

(58) Field of Classification Search
CPC .. H04N 19/105; H04N 19/124; H04N 19/126; H04N 19/13; H04N 19/157;
(Continued)

(56) References Cited

U.S. PATENT DOCUMENTS 11,451,840 B2 * 9/2022 Coban ................... H04N 19/184
2012/0051440 A1 * 3/2012 Parfenov ................ H04N 19/40
375/240.26

(Continued)

FOREIGN PATENT DOCUMENTS

CN 109691111 A 4/2019
JP 2021519544 A 8/2021
(Continued)

OTHER PUBLICATIONS

Bross, Benjamin, et al., "[Uploaded in 10 parts] Versatile Video Coding (Draft 7)", No. JVET-P2001, 16. JVET Meeting; Oct. 1, 2019-Oct. 11, 2019; Geneva; (The Joint Video Exploration Team of ISO/IEC JTC1/SC29/WG11 and ITU-T SG.16 ), XP030224330 [489 pp.]URL:http://phenix.int-evry.fr/jvet/doc_end_user/documents/16_Geneva/wg11/JVET-P2001-v14.zip JVET-P2001-vE.docx,, 47 pp.

(Continued)

*Primary Examiner* — Behrooz M Senfi
(74) *Attorney, Agent, or Firm* — Perkins Coie LLP; Michael A. Glenn

(57) ABSTRACT

A decoder configured to decode residual levels, and sequentially dequantize the residual levels by selecting a quantizer out of a set of default quantizers depending on a current transition state, and updating the current transition state
(Continued)

depending on a current residual level's characteristic obtained by an application of a binary function onto the current residual level, and depending on a quantization mode information contained in the data stream. The current transition state transitions, according to a surjective mapping which depends on the quantization mode information, from a domain of combinations of a set of one or more transition states with the current residual level's characteristic onto the set of one or more transition states, wherein a cardinality of the set of one or more transition states differs depending on the quantization mode information.

25 Claims, 11 Drawing Sheets

(51) Int. Cl.
  *H04N 19/13* (2014.01)
  *H04N 19/157* (2014.01)
  *H04N 19/176* (2014.01)
  *H04N 19/18* (2014.01)
  *H04N 19/184* (2014.01)
  *H04N 19/186* (2014.01)
  *H04N 19/61* (2014.01)
  *H04N 19/70* (2014.01)

(52) U.S. Cl.
  CPC ......... *H04N 19/157* (2014.11); *H04N 19/176* (2014.11); *H04N 19/18* (2014.11); *H04N 19/184* (2014.11); *H04N 19/186* (2014.11); *H04N 19/61* (2014.11); *H04N 19/70* (2014.11)

(58) Field of Classification Search
  CPC .... H04N 19/176; H04N 19/18; H04N 19/184; H04N 19/186; H04N 19/61; H04N 19/70; H04N 19/91

USPC .................................................... 375/240.03
  See application file for complete search history.

(56) References Cited

U.S. PATENT DOCUMENTS

| | | |
|---|---|---|
| 2016/0050427 A1 | 2/2016 | Berry et al. |
| 2018/0070107 A1 | 3/2018 | Ramasubramonian et al. |
| 2019/0387259 A1 | 12/2019 | Coban et al. |

FOREIGN PATENT DOCUMENTS

| | | | |
|---|---|---|---|
| TW | 201505423 A | 2/2015 | |
| WO | WO-2019185769 A1 * | 10/2019 | ........... H04N 19/105 |
| WO | WO-2020056017 A9 * | 5/2020 | ........... H04N 19/124 |

OTHER PUBLICATIONS

Chen, Jianle, et al., "Algorithm description for Versatile Video Coding and Test Model 5 (VTM 5)", JVET-N1002-v2, Joint Video Experts Team (JVET) of ITU-T SG 16 WP 3 andISO/IEC JTC 1/SC 29/WG 11 14th Meeting: Geneva, CH, Mar. 19-27, 2019, 77 pp.

Chen, Jianle, et al., "Algorithm description for Versatile Video Coding and Test Model 7(VTM 7)", JVET-P2002-v1, Joint Video Experts Team (JVET) of ITU-T SG 16 WP 3 and ISO/IEC JTC 1/SC 29/WG 11, 6th Meeting: Geneva, CH, Oct. 1-11, 2019, 90 pp.

Kasner, James H, et al., "Universal trellis coded quantization", IEEE Transactions on Image Processing, Dec. 1, 1999 IEEE Service Center, Piscataway, NJ, US, vol. 8, No. 12, XP011026433, Dec. 1, 1999, 11 pp.

Schwarz, Heiko, et al., "Hybrid Video Coding with Trellis-Coded Quantization", 2019 Data Compression Conference (DCC), IEEE, XP033548461, pp. 182-191.

* cited by examiner

```
if( setId[ k ] == 0 ) {
    n = 2 * level[ k ]
} else {
    n = 2 * level[ k ] – sign( level[ k ] )
}
trec[ k ] = n * quant_step_size[ k ]
```

```
n = 2 * level[ k ] – ( setId[ k ] > 0 ? sign( level[ k ] ) : 0 )
trec[ k ] = ( n * scale[ k ] + add ) >> shift
```

```
state = 0
for( k = kstart; k >= 0; k-- )
{
    n = 2 * level[ k ] – ( setId[ state ] > 0 ? sign( level[ k ] ) : 0 )
    trec[ k ] = ( n * scale[ k ] + add ) >> shift
    state = state_trans_table[ state ][ path(level[ k ] ) ]
}
```

Fig. 4

```
setId[4] = { 0, 0, 1, 1 } state_trans_table[4][2] = { {0,2}, {2,0}, {1,3}, {3,1} }
```

Fig. 5

```
state = 0
for( k = kstart; k >= 0; k-- )
{
    if( level[ k ] != 0 )
    {
        n = 2 * level[ k ] + ( level[ k ] > 0 ? - (state & 1) : (state & 1 ) );
        trec[ k ] = n * quant_step_size[ k ]
    } else {
        trec[ k ] = 0
    }
    state = state_trans_table [ state ] [ level [ k ] & 1 ]
}
```

Fig. 11

DECODER, ENCODER AND METHOD FOR SUPPORTING ADAPTIVE DEPENDENT QUANTIZATION OF TRANSFORM COEFFICIENT LEVELS

CROSS-REFERENCES TO RELATED APPLICATIONS

This application is a continuation of copending International Application No. PCT/EP2020/087146, filed Dec. 18, 2020, which is incorporated herein by reference in its entirety, and additionally claims priority from European Application No. EP 19 218 785.4, filed Dec. 20, 2019, which is/all of which are incorporated herein by reference in its/their entirety.

1 TECHNICAL FIELD

Embodiments according to the invention related to decoder, encoder and methods for supporting adaptive dependent quantization of transform coefficient levels.

The invention applies to lossy coding of a block of residual samples. The residual samples represent the difference between the original block of samples and the samples of a prediction signal (the prediction signal can be obtained by intra-picture prediction or inter-picture prediction, or by a combination of intra- and inter-picture prediction, or by any other means; in a special case the prediction signal could be set equal to zero).

The residual block of samples is transformed using a signal transform. Typically, a linear and separable transform is used (linear means that the transforms are linear, but may incorporate an additional rounding of transform coefficients). Often an integer approximation of the DCT-II or an integer approximation of other transforms of the DCT/DST family is used. Different transforms may be used in horizontal or vertical direction. The transform is not restricted to linear and separable transforms. Any other transform (linear and non-separable, or non-linear) may be used. In particular, a second order non-separable transform may be applied to the transform coefficients or a part of the transform coefficients obtained after a first separable transform. As result of the signal transform, a block of transform coefficients is obtained that represents the original block of residual samples in a different signal space. In a special case, the transform can be equal to the identify transform (i.e., the block of transform coefficients can be equal to the block of residual samples). The block of transform coefficients is coded using lossy coding. At the decoder side, the block of reconstructed transform coefficients is inverse transformed so that a reconstructed block of residual samples is obtained. And finally, by adding the prediction signal, a reconstructed block of image samples is obtained.

The invention describes a concept for lossy coding of a block of transform coefficients. It particularly describes a method for enabling multiple variants of dependent quantization and an adaptive selection of the variant applied.

In this context, dependent quantization refers to a quantization method with the following properties: At the encoder side, the block of transform coefficients is mapped to a block of transform coefficient levels (i.e., quantization indexes), which represent the transform coefficients with reduced fidelity. At the decoder side, the quantization indexes are mapped to reconstructed transform coefficients (which differ from the original transform coefficients due to quantization). In contrast to conventional scalar quantization, the transform coefficients are not independently quantized. Instead, the admissible set of reconstruction levels for a certain transform coefficient depends on the chosen quantization indexes for other transform coefficients.

There are multiple variants of dependent quantization, which mainly deviate in the number of possible so-called quantization states. Increasing the number of quantization states typically improves the coding efficiency, but also increases the encoder complexity. Hence, it is reasonable to support multiple variants of dependent quantization, in order to give an encoder, the freedom to choose a suitable trade-off between coding efficiency and implementation complexity. But for a decoder, the implementation complexity increases with the number of supported variants for quantization.

The invention describes a method for supporting independent quantization and multiple variants of dependent quantization in a unified framework. The reconstruction process as well as the entropy coding of transform coefficient levels are designed in a way that a decoder can support all variants with a single implementation. The only aspect that depends on the variant chosen is the selection of the state transition table. The invention includes following aspects:
 support of two or more variants of dependent quantization in addition to conventional independent quantization;
 in particular, adding a variant of dependent quantization with 8 states;
 high-level signaling of the quantization method used;
 unified process for the reconstruction of transform coefficient levels from quantization indexes;
 unified process for the entropy coding of quantization indexes (including the criterion for the maximum number of context-coded bin);
 unified state-dependent context selection for the significance flag.

2 BACKGROUND OF THE INVENTION

In the following, the concept of dependent quantization and an associated entropy coding of transform coefficient levels is described. The description particularly emphasis the design aspects specified in draft 7 for the Versatile Video Coding standard (VTM-7). It should, however, be noted that several variations of this particular design are possible.

2.1 Dependent Quantization

Dependent quantization of transform coefficients refers to a concept in which the set of available reconstruction levels for a transform coefficient depends on the chosen quantization indexes for preceding transform coefficients in reconstruction order (inside the same transform block). Multiple sets of reconstruction levels are pre-defined and, based on the quantization indexes for preceding transform coefficients (in coding order), one of the predefined sets is selected for reconstructing the current transform coefficient.

2.1.1 Sets of Reconstruction Levels

The set of admissible reconstruction levels for a current transform coefficient is selected (based on the quantization indexes for preceding transform coefficients in coding order) among a collection (two or more sets) of pre-defined sets of reconstruction levels. The values of the reconstruction levels of the sets of reconstruction levels are parameterized by a block-based quantization parameter. The block-based quantization parameter (QP) determines a quantization step size $\Delta$ and all reconstruction levels (in all sets of reconstruction levels) represent integer multiples of the quantization step size $\Delta$. The quantization step size $\Delta_k$ for a particular transform coefficient $t_k$ (with k indicating the reconstruction order) may not be solely determined by the block quantization parameter QP, but it is also possible that the quantization step size $\Delta_k$ for a particular transform coefficient $t_k$ is determined by a quantization weighting matrix and the block quantization parameter. Typically, the quantization step size $\Delta_k$ for a transform coefficient $t_k$ is given by the product of the weighting factor $w_k$ for the transform coefficient $t_k$ (specified by the quantization weighting matrix) and the block quantization step size $\Delta_{block}$ (specified by the block quantization parameter), $$\Delta_k = w_k \cdot \Delta_{block}$$

In VTM-7, the dependent scalar quantization for transform coefficients uses exactly two different sets of reconstruction levels. All reconstruction levels of the two sets for a transform coefficient $t_k$ represent integer multiples of the quantization step size $\Delta_k$ for this transform coefficient (which is, at least partly, determined by a block-based quantization parameter). Note that the quantization step size $\Delta_k$ just represents a scaling factor for the admissible reconstruction values in both sets. Except of a possible individual quantization step size $\Delta_k$ for the different transform coefficients $t_k$ inside a transform block (and, thus, an individual scaling factor), the same two sets of reconstruction levels are used for all transform coefficients.

FIG. 1 shows two sets of reconstruction levels. The hollow and filled circles indicate two different subsets inside the sets of reconstruction levels; the subsets can be used for determining the set of reconstruction levels for the next transform coefficient in reconstruction order.

The two sets of reconstruction levels are shown in FIG. 1:
The reconstruction levels that are contained in the first quantization set (labeled as set 0 in FIG. 1) represent the even integer multiples of the quantization step size.
The second quantization set (labeled as set 1 in FIG. 1) contains all odd integer multiples of the quantization step size and additionally the reconstruction level equal to zero.

Note that both reconstruction sets are symmetric about zero. The reconstruction level equal to zero is contained in both reconstruction sets, otherwise the reconstruction sets are disjoint. The union of both reconstruction sets contains all integer multiples of the quantization step size.

2.1.2 Representation of the Reconstruction Levels

The reconstruction levels that the encoder selects among the admissible reconstruction levels have to be indicated inside the bitstream. As in conventional independent scalar quantization, this can be achieved using so-called quantization indexes, which are also referred to as transform coefficient levels. Quantization indexes (or transform coefficient levels) are integer numbers that uniquely identify the available reconstruction levels inside a quantization set (i.e., inside a set of reconstruction levels). The quantization indexes are sent to the decoder as part of the bitstream (using any entropy coding technique). At the decoder side, the reconstructed transform coefficients can be uniquely calculated based on a current set of reconstruction levels (which is determined by the preceding quantization indexes in coding/reconstruction order) and the transmitted quantization index for the current transform coefficient.

The reconstruction levels in FIG. 1 are labeled with an associated quantization index (the quantization indexes are given by the numbers below the circles that represent the reconstruction levels). The quantization index equal to 0 is assigned to the reconstruction level equal to 0. The quantization index equal to 1 is assigned to the smallest reconstruction level greater than 0, the quantization index equal to 2 is assigned to the next reconstruction level greater than 0 (i.e., the second smallest reconstruction level greater than 0), etc. Or, in other words, the reconstruction levels greater than 0 are labeled with integer numbers greater than 0 (i.e., with 1, 2, 3, etc.) in increasing order of their values. Similarly, the quantization index −1 is assigned to the largest reconstruction level smaller than 0, the quantization index −2 is assigned to the next (i.e., the second largest) reconstruction level smaller than 0, etc. Or, in other words, the reconstruction levels smaller than 0 are labeled with integer numbers less than 0 (i.e., −1, −2, −3, etc.) in decreasing order of their values.

The usage of reconstruction levels that represent integer multiples of a quantization step sizes allow computationally low complex algorithms for the reconstruction of transform coefficients at the decoder side. This is illustrated based on the advantageous example of FIG. 1 in the following. The first quantization set includes all even integer multiples of the quantization step size and the second quantization set includes all odd integer multiples of the quantization step size plus the reconstruction level equal to 0 (which is contained in both quantization sets). The reconstruction process for a transform coefficient can be implemented similar to the algorithm specified in the pseudo-code of FIG. 2.

FIG. 2 shows a Pseudo-code illustrating the reconstruction process for transform coefficients. k represents an index that specifies the reconstruction order of the current transform coefficient, the quantization index for the current transform coefficient is denoted by level[k], the quantization step size $\Delta_k$ that applies to the current transform coefficient is denoted by quant_step_size[k], and trec[k] represents the value of the reconstructed transform coefficient $t_k'$. The variable setId[k] specifies the set of reconstruction levels that applies to the current transform coefficient. It is determined based on the preceding transform coefficients in reconstruction order; the possible values of setId[k] are 0 and 1. The variable n specifies the integer factor of the quantization step size; it is given by the chosen set of reconstruction levels (i.e., the value of setId[k]) and the transmitted quantization index level[k].

In the pseudo-code of FIG. 2, level[k] denotes the quantization index that is transmitted for a transform coefficient $t_k$ and setId[k] (being equal to 0 or 1) specifies the identifier of the current set of reconstruction levels (it is determined based on preceding quantization indexes in reconstruction order as will be described in more detail below). The variable n represents the integer multiple of the quantization step size given by the quantization index level[k] and the set identifier setId[k]. If the transform coefficient is coded using the first set of reconstruction levels (setId[k]==0), which contains the even integer multiples of the quantization step size $\Delta_k$, the variable n is two times the transmitted quantization index. If the transform coefficient is coded using the second set of reconstruction levels (setId[k]==1), we have the following three cases: (a) if level[k] is equal to 0, n is also equal to 0; (b) if level[k] is greater than 0, n is equal to two times the quantization index level[k] minus 1; and (c) if level[k] is less than 0, n is equal to two times the quantization index level[k] plus 1. This can be specified using the sign function $$\text{sign}(x) = \begin{cases} 1 & : x > 0 \\ 0 & : x = 0 \\ -1 & : x < 0 \end{cases}.$$

Then, if the second quantization set is used, the variable n is equal to two times the quantization index level[k] minus the sign function sign(level[k]) of the quantization index.

Once the variable n (specifying the integer factor of the quantization step size) is determined, the reconstructed transform coefficient $t_k'$ is obtained by multiplying n with the quantization step size $\Delta_k$.

FIG. 3 shows a Pseudo-code illustrating an alternative implementation of the pseudo-code in FIG. 2. The main change is that the multiplication with the quantization step is represented using an integer implementation using a scale and a shift parameter. Typically, the shift parameter (represented by shift) is constant for a transform block and only the scale parameter (given by scale[k]) may depend on the location of the transform coefficient. The variable add represents a rounding offset, it is typically set equal to add= (1<<(shift−1)). With $\Delta_k$ being the nominal quantization step for the transform coefficient, the parameters shift and scale [k] are chosen in a way that we have $\Delta_k \approx \text{scale}[k] \cdot 2^{-shift}$.

As mentioned above, instead of an exact multiplication with the quantization step size $\Delta_k$, the reconstructed transform coefficient $t_k'$ can be obtained by an integer approximation. This is illustrated in the pseudo-code in FIG. 3. Here, the variable shift represents a bit shift to the right. Its value typically depends only on the quantization parameter for the block (but it is also possible that the shift parameter can be changed for different transform coefficients inside a block). The variable scale[k] represents a scaling factor for the transform coefficient $t_k$; in addition to the block quantization parameter, it can, for example, depend on the corresponding entry of the quantization weighting matrix. The variable add specifies a rounding offset, it is typically set equal to add=(1<<(shift−1)). It should be noted that the integer arithmetic specified in the pseudo-code of FIG. 3 (last line) is, with exception of the rounding, equivalent to a multiplication with a quantization step size $\Delta_k$, given by $$\Delta_k = \text{scale}[k] \cdot 2^{-shift}.$$

Another (purely cosmetic) change in FIG. 3 relative to FIG. 2 is that the switch between the two sets of reconstruction levels is implemented using the ternary if-then-else operator (a?b:c), which is known from programming languages such as the C programming language.

2.1.3 Dependent Reconstruction of Transform Coefficients

Another important design aspect of dependent scalar quantization is the algorithm used for switching between the defined quantization sets (sets of reconstruction levels). The used algorithm determines the "packing density" that can be achieved in the N-dimensional space of transform coefficients (and, thus, also in the N-dimensional space of reconstructed samples). A higher packing density eventually results in an increased coding efficiency.

In VTM-7, the transition between the quantization sets (set 0 and set 1) is determined by a state variable (or quantization state). For the first transform coefficient in reconstruction order, the state variable is set equal to a pre-defined value. Typically, the pre-defined value is equal to 0. The state variable for the following transform coefficients in coding order are determined by an update process. The state for a particular transform coefficient only depends on the state for the previous transform coefficient in reconstruction order and the value of the previous transform coefficient.

The state variable has four possible values (0, 1, 2, 3). On the one hand, the state variable specifies the quantization set that is used for the current transform coefficient. The quantization set 0 is used if and only if the state variable is equal to 0 or 1, and the quantization set 1 is used if and only if the state variable is equal to 2 or 3. On the other hand, the state variable also specifies the possible transitions between the quantization sets.

The state for a particular transform coefficient only depends on the state for the previous transform coefficient in reconstruction order and a binary function of the value of the previous transform coefficient. The binary function is referred to as path in the following. In VTM-7, the following state transition table is used, where "path" refers to the said binary function of the previous transform coefficient level in reconstruction order.

TABLE 1

State transition table in VTM-6.

| current state | quantization set for current coefficient | next state path 0 | next state path 1 |
| --- | --- | --- | --- |
| 0 | 0 | 0 | 2 |
| 1 | 0 | 2 | 0 |
| 2 | 1 | 1 | 3 |
| 3 | 1 | 3 | 1 |

In VTM-7, the path is given by the parity of the quantization index. With level[k] being the transform coefficient level, it can be determined according to path=(level[$k$]&1), where the operator & represents a bit-wise "and" in two-complement integer arithmetic.

As an alternative, the path could also represent other binary functions of level[k]. As an example, it can specify whether a transform coefficient level is equal or not equal to 0:

$$\text{path} = \begin{cases} 0 & : \text{ level } [k] == 0 \\ 1 & : \text{ level } [k] \neq 0 \end{cases}.$$

The concept of state transition for the dependent scalar quantization allows low-complexity implementations for the reconstruction of transform coefficients in a decoder. An example for the reconstruction process of transform coefficients of a single transform block is shown in FIG. 4 using C-style pseudo-code.

FIG. 4 shows a Pseudo-code illustrating the reconstruction process of transform coefficients for a transform block. The array level represents the transmitted transform coefficient levels (quantization indexes) for the transform block and the array trec represent the corresponding reconstructed transform coefficients. The 2d table state_trans_table specifies the state transition table and the table setId specifies the quantization set that is associated with the states. The function path( ) specifies a binary function of the transform coefficient level.

In the pseudo-code of FIG. 4, the index k specifies the reconstruction order of transform coefficients. It should be noted that, in the example code, the index k decreases in reconstruction order. The last transform coefficient has the index equal to k=0. The first index kstart specifies the reconstruction index (or, more accurately, the inverse reconstruction index) of the first reconstructed transform coefficient. The variable kstart may be set equal to the number of transform coefficients in the transform block minus 1, or it may be set equal to the index of the first non-zero quantization index (for example, if the location of the first non-zero quantization index is transmitted in the applied entropy coding method) in coding/reconstruction order. In the latter case, all preceding transform coefficients (with indexes k>kstart) are inferred to be equal to 0. The reconstruction process for each single transform coefficient is the same as in the example of FIG. 3. As for the example in FIG. 3, the quantization indexes are represented by level[k] and the associated reconstructed transform are represented by trec[k]. The state variable is represented by state. The 1d table setId[ ] specifies the quantization sets that are associated with the different values of the state variable and the 2d table state_trans_table[ ][ ] specifies the state transition given the current state (first argument) and the path (second argument). As an example, the path could be given by the parity of the quantization index (using the bit-wise and operator &), but other concepts are possible. As a further example, the path could specify whether the transform coefficient is equal or unequal to zero. Examples, in C-style syntax, for the tables are given in FIG. 5 (these tables are identical to Table 1).

FIG. 5 shows a state transition table state_trans_table and the table setId, which specifies the quantization set associated with the states. The table given in C-style syntax represents the tables specified in Table 1.

Instead of using a table state_trans_table[ ][ ] for determining the next state, an arithmetic operation yielding the same result can be used. Similarly, the table setId[ ] could also be implemented using an arithmetic operation. Or the combination of the table look-up using the 1d table setId[ ] and the sign function could be implemented using an arithmetic operation.

2.2 Entropy Coding of Transform Coefficient Levels

The main aspect of dependent scalar quantization is that there are different sets of admissible reconstruction levels (also called quantization sets) for the transform coefficients. The quantization set for a current transform coefficient is determined based on the values of the quantization index for preceding transform coefficients. If we consider the advantageous example in FIG. 1 and compare the two quantization sets, it is obvious that the distance between the reconstruction level equal to zero and the neighboring reconstruction levels is larger in set 0 than in set 1. Hence, the probability that a quantization index is equal to 0 is larger if set 0 is used and it is smaller if set 1 is used. In VTM-7, this effect is exploited in the entropy coding by switching probability models based on the states that are used for a current quantization index.

Note that for a suitable switching of codeword tables or probability models, the path (binary function of the quantization index) of all preceding quantization indexes has to be known when entropy decoding a current quantization index (or a corresponding binary decision of a current quantization index).

In VTM-7, the quantization indexes are coded using binary arithmetic coding similar to H.264|MPEG-4 AVC or H.265|MPEG-H HEVC. For that purpose, the non-binary quantization indexes are first mapped onto a series of binary decisions (which are commonly referred to as bins).

2.2.1 Binarization

The quantization indexes are transmitted as absolute value and, for absolute values greater than 0, a sign. While the sign is transmitted as single bin, there are many possibilities for mapping the absolute values onto a series of binary decisions.

TABLE 2

Binarization of absolute values |q| of transform coefficient levels in VTM-7.

| |q| | sig_flag | gt1_flag | par_flag | gt3_flag | rem |
|---|---|---|---|---|---|
| 0 | 0 | — | — | — | — |
| 1 | 1 | 0 | — | — | — |
| 2 | 1 | 1 | 0 | 0 | — |
| 3 | 1 | 1 | 1 | 0 | — |
| 4 | 1 | 1 | 0 | 1 | 0 |
| 5 | 1 | 1 | 1 | 1 | 0 |
| 6 | 1 | 1 | 0 | 1 | 1 |
| 7 | 1 | 1 | 1 | 1 | 1 |
| 8 | 1 | 1 | 0 | 1 | 2 |
| 9 | 1 | 1 | 1 | 1 | 2 |
| 10 | 1 | 1 | 0 | 1 | 3 |
| 11 | 1 | 1 | 1 | 1 | 3 |
| 12 | 1 | 1 | 0 | 1 | 4 |
| 13 | 1 | 1 | 1 | 1 | 4 |
| 14 | 1 | 1 | 0 | 1 | 5 |
| 15 | 1 | 1 | 1 | 1 | 5 |
| ... | ... | ... | ... | ... | ... |

The binarization of absolute values used in VTM-7 is illustrated in Table 2. The following binary and non-binary syntax elements are transmitted:
  sig_flag specifies whether the absolute value |q| of the transform coefficient level is greater than 0;
  if sig_flag is equal to 1, gt1_flag specifies whether the absolute value |q| of the transform coefficient level is greater than 1;
  if gt1_flag is equal to 1, par_flag specifies the parity of the absolute value |q| of the transform coefficient level, and gt3_flag specifies whether the absolute value |q| of the transform coefficient level is greater than 3;
  if gt3_flag is equal to 1, the non-binary value rem specifies the remainder of the absolute level |q|. This syntax element is transmitted in bypass mode of the arithmetic coding engine, using a Golomb-Rice code.

Not present syntax elements are inferred to be equal to 0. At the decoder side the absolute value of the transform coefficient levels is reconstructed as follows:

$$|q|=\text{sig\_flag}+gt1\_\text{flag}+\text{par\_flag}+2*(gt3\_\text{flag}+\text{rem})$$

For non-zero transform coefficient levels (indicated by sig_flag equal to 1), a sign_flag specifying the sign of the transform coefficient level is additionally transmitted in bypass mode.

2.2.2 Coding Order of Bins and Bypass Mode

The entropy of transform coefficient levels in VTM-7 shares several aspects with that of HEVC. But it also includes additional aspects by which the entropy coding is adapted to dependent quantization.

FIG. 6 shows a Signaling of the position of the first non-zero quantization index 120 in coding order (highlighted sample). In addition to the position of the first non-zero transform coefficient 120, only bins for the coefficients 122 succeeding the first non-zero quantization index 120 in coding order 102 are transmitted (e.g., blue-marked samples), the coefficients preceding the first non-zero quantization index 120 in coding order 102 are inferred to be equal to 0 (e.g., white-marked samples).

Each block of transform coefficients is partitioned into fixed-size subblocks (also called coefficient groups). In general, the subblocks have a size of 4×4 coefficients (see FIG. 6). In some cases, other sizes may be used (e.g., 2×2, 2×4, 4×2, 2×8, or 8×2).

Similar to HEVC, the coding of a block of transform coefficients proceeds as follows:

First, a so-called coded_block_flag is transmitted which specifies whether there are any non-zero transform coefficient levels in the transform block. If coded_block_flag is equal to 0, all transform coefficient levels are equal to 0, and no further data is transmitted for the transform block. In some cases (e.g. in the Skip mode), the coded_block_flag may not be explicitly transmitted, but is inferred based on other syntax elements.

If coded_block_flag is equal to 1, the x and y coordinate of the first significant transform coefficient in coding order is transmitted (this is sometimes referred as last significant coefficient, since the actual scanning order specifies a scanning from high-frequency to low frequency components);

The scanning of transform coefficients proceeds on the basis of subblocks (typically, 4×4 subblocks); all transform coefficient levels of a subblock are coded before any transform coefficient level of any other subblock is coded; the subblocks are processed in a pre-defined scanning order, starting with the subblock that contains the first significant coefficient in scanning order and ending with the subblock that contains the DC coefficient;

The syntax includes a coded_subblock_flag, which indicates whether the subblock contains any non-zero transform coefficient levels; for the first and last subblock in scanning order (i.e., the subblock that contains the first significant coefficient in scanning order and the subblock that contains the DC coefficient), this flag is not transmitted, but inferred to be equal to 1; when the coded_subblock_flag is transmitted, it is typically transmitted at the start of a subblock;

For each subblock with coded_subblock_flag equal to 1, the transform coefficient levels are transmitted in multiple scan passes over the scanning positions of a subblock.

In the following, we will initially neglect a special aspect (which will be described later). Without that special aspect, the coding of subblocks with coded_subblock_flag equal to 1 proceeds as follows:

For the first subblock in coding order (i.e., the subblock that includes the first significant scanning position, for which the x and y coordinate are explicitly transmitted), the coding starts at the scan position firstSigScanIdx of the first non-zero coefficient in scanning order (i.e., the scan position that corresponds to the explicitly transmitted x and y coordinate). For all other subblocks, the coding starts at the minimum scan index minSubblockScanIdx inside the subblock. The scan ends at the maximum scan index maxSubblockScanIdx inside the subblock.

In the first pass, the regular coded bins sig_flag, gt1_flag, par_flag, and gt3_flag are transmitted:

The sig_flag is not transmitted if it can be inferred to be equal to 1. It can be inferred to be equal to zero in the following two cases:
(1) The current scan position is equal to the scan index startScanIdx of the first non-zero coefficient in scanning order (i.e., the scan position that corresponds to the explicitly transmitted x and y coordinate);
(2) The current subblock is a subblock for which a coded_subblock_flag equal to 1 was transmitted, the current scan index is the maximum scan index maxSubblockScanIdx inside the subblock, and all previously transmitted sig_flag's for the current subblock are equal to 1.

If sig_flag[k] for a scan index k is equal to 1 (transmitted or inferred), a gt1_flag is transmitted. Otherwise, gt1_flag is inferred to be equal to zero.

If gt1_flag[k] for a scan index k is equal to 1, a par_flag and a gt3_flag are transmitted. Otherwise, the par_flag and the gt3_flag are inferred to be equal to zero.

In the second pass, the remainder values rem are coded for those scan indexes, for which gt3_flag equal to 1 was transmitted. For all other scan indexes, the remainder rem is inferred to be equal to 0. The remainder values rem are coded using a concatenation of a Rice code and and exponential Golomb code, which is parameterized by a so-called Rice parameter. The bins of the corresponding codewords are coded in bypass mode. The Rice parameter is determined based on already coded syntax elements (see below).

Finally, in the last pass, for all scan indexes k with sig_flag[k] equal to 1 (coded or inferred), a sign_flag is transmitted, which specifies whether the transform coefficient value is negative or positive.

The following pseudo code further illustrates the coding process for the transform coefficient levels inside a subblock. It is illustrated from a decoder perspective. The Boolean variable firstSubblock specifies whether the current subblock is the first subblock in coding order (inside the transform block). The firstSigScanIdx specifies the scan index that corresponds to the position of the first significant transform coefficient in the transform block (the one that is explicitly signaled at the start of the transform block syntax). minSubblockScanIdx and maxSubblockScanIdx represent the minimum and maximum values of the scan indexes for the current subblock. Note that the first scan index for which any data is transmitted depends on whether the subblock includes the first significant coefficient in scanning order. If this is the case, the first scan pass starts at the scan index that corresponds to the first significant transform coefficient; otherwise, the first scan pass starts at the minimum scan index of the subblock. The variable coeff[k] for a scan index k represents the reconstructed transform coefficient level. The encoding proceeds analog to the decoding.

Pseudo-code specifying the decoding of subblock with coded subblock flag equal to 1 (simplified):

```
startScanIdx = ( firstSubblock ? firstSigScanIdx : minSubblockScanIdx )
endScanIdx = maxSubblockScanIdx
// first pass (regular coded bins)
for( k = startScanIdx; k <= endScanIdx; k++) {
  coeff[k] = 0
  if( sig_flag cannot be inferred to be equal to 1 ) {
    decode sig_flag[k]
  }
```

Pseudo-code specifying the decoding of subblock with coded subblock flag equal to 1 (simplified):

```
  if( sig_flag[k] != 0 ) {
    decode gt1_flag[k]
    if( gt1_flag[k] != 0 ) {
      decode par_flag[k]
      decode gt3_flag[k]
    }
    coeff[k] = 1 + gt1_flag[k] + par_flag[k] + 2 * gt3_flag[k]
  }
  state = stateTransTable [state] [coeff[k] & 1]
}
// second pass (bypass coding of remainder)
for( k = startScanIdx; k <= endScanIdx; k++) {
  if( gt3_flag[k] != 0 ) {
    decode rem[k]
    coeff[k] = coeff[k] + 2 * rem[k]
  }
}
// third pass (bypass coding of signs)
for( k =startScanIdx; k <= endScanIdx; k++ ) f
  if( coeff[k] != 0 ) f
    decode sign_flag[k]
    if( sign_flag[k] == 1 )
      coeff[k] = -coeff[k]
  }
}
```

One disadvantage relative to HEVC was that the maximum number of regular coded bins per transform coefficient is increased. In order to circumvent this issue, the following concept is included in VTM-7:

The maximum number of regular coded bins maxNumRegBins for a transform block is set equal to maxNumRegBins=1.75*width*height, where width and height represent the size of the transform block (more accurately, of the non-zero out region of the transform block, in cases in which transform coefficients are forced to be equal to zero).

At the start of the transform block, a counter remRegBins, which specifies the available number of regular coded bins is set equal to remRegBins=maxNumRegBins.

After a regular coded bin is encoded or decoded, the counter remRegBins is decreased by one.

If, at the beginning of the coding for a scan position in the first pass, the counter is less than 4 (in which case, not all bins sig_flag, gt1_flag, par_flag and gt3_flag could be transmitted without exceeding the maximum number of regular coded bins), the first pass is terminated. In addition, the remainder values are only transmitted for such scan position that were included in the first pass.

The absolute levels for which no data is coded in the first scan pass are completely coded in bypass mode. They are coded using the same class of codes as for the remainder rem. The Rice parameter as well as a variable pos0 are determined based on already coded syntax elements (see below). These absolutes levels |q| are not directly coded, but they are first mapped to syntax elements abs_level, which are then coded using the parametric codes.

The mapping of an absolute value |q| to the syntax element abs_level depends on a variable pos0. It is specified by abs_level=(|q|==0?pos0:(|q|<=pos0?|q|−1:|q|)

At the decoder side, the mapping of the syntax element abs_level to the absolute value |q| is specified as follows

|q|=(abs_level==pos0?0:(abs_level<pos0?abs_level+1:abs_level)

It should be noted that limit on the number of regular coded bins is applied on transform block basis and not on a subblock basis. That means, the counter remRegBins is initialized at the beginning of a transform block and decreased for each regular coded bin. If the coding switches to the bypass mode in a particular subblock, all transform coefficient levels of all following subblocks in coding order are also coded in bypass mode.

The coding process for a subblock (with coded_subblock_flag equal to 1) is illustrated in the following pseudo code. As in the previous pseudo-code, the coding process is illustrated from a decoder perspective. For the first coded subblock, the initial value of the counter remRegBins is equal to maxNumRegBins. For all following subblocks, the initial value of the counter remRegBins is equal to the value that was obtained at the end of the previous coded subblock. The scan index startIdxBypass is the first scan index at which the bypass coding (i.e., the coding of abs_level) starts inside the subblock (if applicable).

Pseudo-code(114)specifyingthedecodingofsubblockwithcoded subblock flagequalto 1 Omit bypass mode):

```
startScanIdx = (firstSubblock > firstSigScanIdx : minSubblockScanIdx)
endScanIdx = maxSubblockScanIdx
startIdxBypass = (remRegBins >= 4 ? maxSubblockScanIdx + 1 : startScanIdx)
// first pass (regular coded bins)
```

-continued

Pseudo-code(114)specifyingthedecodingofsubblockwithcoded subblock flagequalto 1 Omit bypass mode):

```
for( k - startScanIdx; k <= endScanIdx && remRegBins >=4; k++ ) {
   coeff[k] = 0
   If( sig_flag cannot be inferred to be equal to 1 ) {
      decode sig_flag[k]
      remRegBins = remRegBins - 1
   }
   If( sig_flag[k] != 0 ) {
      decode gt1_flag[k]
      remRegBins = remRegBins - 1
      if( gt1_flag[k] != 0 ) {
         decode par_flag[k]
         decode gt3_flag[k]
         remRegBins = remRegBins - 2
      }
      coeff[k] - 1 + gt1_flag[k] + par_flag[k] + 2 * gt3_flag[k]
   }
   if( remRegBins < 4 ) {
      startIdxBypass = k + 1
   }
   state = stateTransTable [state] [coeff[k] & 1]
}
// second pass (bypass coding of remainder)
for( k = startScanIdx; k < startIdxBypass; k++ ) {
   if( gt3_flag[k] != 0 ) {
      decode rem[k]
      coeff[k] = coeff[k] + 2 * rem[k]
   }
}
// third pass (bypass coding of absolute levels)
for( k = startIdxBypass; k <= endScanIdx; k++ ) {
   derive pos0
   decode abs_level[k]
   if( abs_level[k] -- p0S0 )
      coeff[k] - 0
   else if ( abs level[k] < pos0)
      coeff[k] = abs level[k] + 1
   else
      coeff[k] = abs_level[k]
   state = stateTransTable [state] [coeff[k] & 1]
}
// fourth pass (bypass coding of signs)
for( k = startScanIdx; k <= endScanIdx; k++ ) {
   if( coeff[k] != 0 ) {
      decode sign_flag[k]
      if( sign_flag[k]
         coeff[k] = -coeff[k]
   }
}
```

2.2.3 Context Modelling

For the regular coded bins sig_flag, gt1_flag, par_flag, and gt3_flag one of multiple probability models (or contexts) is selected for the actual coding.

FIG. 7 shows a local template used for selecting probability models for one or more bins. The black square 130 represents the current scan position and the highlighted samples 132 (e.g., the blue squares) represent the neighboring scan positions inside the template.

2.2.3.1 Significance Flag sig_flag

For the significance flag, the selected probability model depends on the following:

whether the current transform block is a luma or chroma transform block;

the state for dependent quantization;

the x and y coordinate of the current transform coefficient;

the partially reconstructed absolute values (after the first pass) in a local neighborhood.

In the following, more details are given.

The variable state represents the state for a current transform coefficient used in dependent quantization. The state can take the values 0, 1, 2, or 3. Initially, the state is set equal to 0. as explained above, the state for a current transform coefficient is given by the state for the previous coefficient in coding order and the parity (or, more general, a binary function) of the previous transform coefficient level.

With x and y being the coordinates of a current transform coefficient inside the transform block, let diag=x+y be diagonal position of the current coefficient. Given the diagonal position, a diagonal class index dsig is derived as follows:

dsig=(diag<2?2:(diag<5?1:0)) for luma transform blocks and dsig=(diag<2?1:0) for chroma transform blocks The ternary operator (c?a:b) represents an if-then-else statement. If the condition c is true, the value of a is used, otherwise (c is false), the value b is used.

The context also depends on the partially reconstructed absolute values inside a local neighborhood. In VTM-7, the local neighborhood is given by the template T shown in FIG. 7. But other templates are possible. The template used could also depend on whether a luma or a chroma block is coded.

Let sumAbs be the sum of partially reconstructed absolute values (after the first pass) in the template T:

$$sumAbs = \sum_{k \in T} abs1[k],$$

where abs1[k] represents the partially reconstructed absolute level for a scan index k after the first pass. With the binarization of VTM-7, it is given by abs1[k]=sig_flag[k]+gt1_flag[k]+par_flag[k]+ 2*gt3_flag[k].

Note that abs1 [k] is equal to the value coeff[k] obtained after the first scan pass (see above).

Let us assume that the possible probability models for the sig_flag are organized in a 1d array. And let ctxIdSig be an index that identifies the probability model used. According to VTM-7, the context index ctxIdSig could be derived as follows:

If the transform block is a luma block, ctxIdSig=min((sumAbs+1)>>1,3)+4*dsig+12*min (state-1,0)

If the transform block is a chroma block, ctxIdSig=36+min((sumAbs+1)>>1,3)+4*dsig+8*min (state-1,0)

Here, the operator ">>" represents a bit shift to the right (in two-complement arithmetic). The operation is identical to a division by two and a downrounding (to the next integer) of the result.

Note that other organizations of the context models are possible. But in any case, the probability model chosen for coding a sig_flag depends on
  whether a luma or a chroma block is coded;
  the state variable, specifically min(state-1, 0);
  the diagonal class dsig;
  the sum of partially reconstructed absolute values (after the first pass) inside the local template, specifically min((sumAbs+1)>>1, 3).

2.2.3.2 Flags gt1_flag, par_flag, and gt3_flag

For the flags gt1_flag, par_flag, and gt3_flag, the selected probability model depends on the following:
  whether the current transform block is a luma or chroma transform block;
  whether the current transform coefficient is the first non-zero coefficient in coding order inside the transform block;
  the x and y coordinate of the current transform coefficient;
  the partially reconstructed absolute values (after the first pass) in a local neighborhood.

Let firstCoeff be a variable that indicates whether the current scan index represents the scan index of the first non-zero transform coefficient level in coding order (i.e., the scan index or which the x and y location are explicitly coded). If the current scan index is equal to the scan index of the first non-zero transform coefficient level, firstCoeff is equal to 1; otherwise, firstCoeff is equal to 0.

With x and y being the coordinates of a current transform coefficient inside the transform block, let diag=x+y be diagonal position of the current coefficient. Given the diagonal position, a diagonal class index dclass is derived as follows:

dclass=(diag==0?3:(diag<3?2:(diag<10?1:0))) for luma transform blocks and
dclass=(diag==0?1:0) for chroma transform blocks The context also depends on the partially reconstructed absolute values inside a local neighborhood. The variable sumAbs is derived as specified above. In addition, a variable numSig is derived, which specifies the number of non-zero transform coefficient levels inside the template T:

numSig=$\Sigma_{k \in T}$sig_flag[k].

Similar as for the sig_flag, let us assume that the possible probability models are organized in a 1d array. And let ctxId be an index that identifies the probability model used. According to VTM-7, the context index ctxId could be derived as follows:

If the transform block is a luma block, ctxId=(firstCoeff?0:1+min(sumAbs-numSig,4)+ 5*dclass)

If the transform block is a chroma block, ctxId=21+(firstCoeff?0:1+min(sumAbs-numSig,4)+ 5*dclass)

Note that other organizations of the context models are possible. But in any case, the probability model chosen depends on
  whether a luma or a chroma block is coded;
  whether the current scan index is the scan index of the first non-zero transform coefficient level in coding order;
  the diagonal class dclass;
  the difference of the sum of partially reconstructed absolute values (after the first pass) inside the local template and the number of non-zero transform coefficient levels inside the local template, specifically min(sumAbs-numSig, 4).

It should be noted that the same context index ctxId is used for gt1_flag, par_flag, and gt3_flag. But for each of these flags, a different set of context models is used.

2.2.3.3 Rice Parameter for Remainder and Bypass-Coded Transform Coefficient Levels Both the remainder rem and the absolute values abs_level are coded using a parametric class of codes, for which the bins are coded in bypass mode (see above). The binarization actually used is determined by a so-called Rice parameter RP. Furthermore, for the absolute levels abs_level, a variable pos0 determines the mapping from the coded syntax element abs_level to the actual absolute values.

The Rice parameter for the remainder RPrem is derived based on the sum of reconstructed absolute values in a local template. In VTM-7, the same template as specified above is used. With T representing the template and coeff[k] representing the reconstructed coefficients for a scan index k, the sum sumAbs is derived according to $$sumAbs = \sum_{k \in T} abs(coeff[k])$$

Note that the completely reconstructed transform coefficient values coeff[k] are used. Let tabRPrem[ ] be a fixed table of size 32. The Rice parameter RPrem is derived according to RPrem=tabRPrem[max(min(sumAbs-20,31),0)].

Let tabRPabs[ ] be another fixed table of size 32. The Rice parameter RPabs used for coding abs_level is derived according to RPabs=tabRPabs[min(sumAbs,31)].

The variable pos0 depends on both, the sum of reconstructed absolute values in the local template and the state variable. The variable pos0 is derived from the quantization state and the Rice parameter RPabs according to pos0=(state<2?1:2)<<RPabs.

2.3 High-Level Signaling of the Quantization Method

VTM-7 supports dependent quantization with 4 states and, additionally, conventional independent scalar quantization. The quantization method chosen by an encoder is indicated in the bitstream as follows.

The picture header includes a syntax element pic_dep_quant_enabled_flag, which is coded using a single bit and indicates whether dependent quantization is used or not used for a current picture. If pic_dep_quant_enabled_flag is equal to 0, conventional independent quantization is used for the current picture. If pic_dep_quant_enabled_flag is equal to 1, the specified variant of dependent quantization is used for the current picture.

The picture header syntax element is not always present in the picture header. Its presence is controlled by another syntax element that is coded in the picture parameter set. The picture parameter set includes a syntax element pps_dep_quant_enabled_idc, which is coded using a fixed-length code of 2 bits and has the following meaning:
- the value of 0 specifies that the pic_dep_quant_enabled_flag is present in the picture header;
- the value of 1 specifies that the pic_dep_quant_enabled_flag is not present in the picture header, but is inferred to be equal to 0 for all pictures that refer to the picture parameter set;
- the value of 2 specifies that the pic_dep_quant_enabled_flag is not present in the picture header, but is inferred to be equal to 1 for all pictures that refer to the picture parameter set;
- the value of 3 is reserved for future use.

The pps_dep_quant_enabled_idc in the picture parameter set is present of a picture parameter set flag constant_slice_header_params_enabled_flag is equal to 1. If the picture parameter set flag constant_slice_header_params_enabled_flag is equal to 0, the picture parameter set syntax element pps_dep_quant_enabled_idc is not present in the picture parameter set, but it is inferred to be equal to 0 (in which case, the pic_dep_quant_enabled_flag is coded in the picture header).

Therefore, it is desired to provide concepts for rendering picture coding and/or video coding more efficient to support adaptive dependent quantization of transform coefficient levels. Additionally, or alternatively, it is desired to reduce a bit stream and thus a signalization cost.

This is achieved by the subject matter of the independent claims of the present application.

Further embodiments according to the invention are defined by the subject matter of the dependent claims of the present application.

3 SUMMARY

An embodiment may have a decoder configured to decode residual levels, which represent a prediction residual, from a data stream, sequentially dequantize the residual levels by selecting a quantizer out of a set of default quantizers depending on a current transition state, dequantizing a current residual level using the quantizer to acquire a dequantized residual value, applying a binary function onto the current residual level to acquire a current residual level's characteristic, and updating the current transition state depending on the current residual level's characteristic using a transition table to be used, reconstruct a media signal using the dequantized residual values, select, depending on a quantization mode information comprised by the data stream, one default transition table out of a set of default transition tables as the transition table to be used, each of which represents a surjective mapping from a domain of combinations of the set of transition states with the current residual level's characteristic onto the set of transition states, wherein the default transition tables differ in a cardinality of the set of transition states, wherein the cardinality is four or larger, and perform, whatever default transition table is selected as the transition table to be used, the selection of the quantizer by mapping, using a first mapping, a predetermined number of bits of the current transition state onto the default quantizers, the predetermined number and the first mapping being equal whatever default transition table is selected as the transition table to be used.

Another embodiment may have an encoder configured to predictively encode a media signal to acquire a residual signal, sequentially quantize residual values which represent the residual signal to acquire residual levels by selecting a quantizer out of a set of default quantizers depending on a current transition state, quantizing a current residual value using the quantizer to acquire a current residual level, applying a binary function onto the current residual level to acquire a current residual level's characteristic, and updating the current transition state depending on the current residual level's characteristic using a transition table to be used, encode the residual levels into the data stream, select, depending on a quantization mode information transmitted in the data stream, one default transition table out of a set of default transition tables as the transition table to be used, each of which represents a surjective mapping from a domain of combinations of the set of transition states with the current residual level's characteristic onto the set of transition states, wherein the default transition tables differ in a cardinality of the set of transition states, wherein the cardinality is four or larger, and perform, whatever default transition table is selected as the transition table to be used, the selection of the quantizer by mapping, using a first mapping, a predetermined number of bits of the current transition state onto the default quantizers, the predetermined number and the first mapping being equal whatever default transition table is selected as the transition table to be used.

Another embodiment may have a method, comprising: decoding residual levels, which represent a prediction residual, from a data stream, sequentially dequantizing the residual levels by selecting a quantizer out of a set of default quantizers depending on a current transition state, dequantizing a current residual level using the quantizer to acquire a dequantized residual value, applying a binary function onto the current residual level to acquire a current residual level's characteristic, and updating the current transition state depending on the current residual level's characteristic using a transition table to be used, reconstructing a media signal using the dequantized residual values, selecting, depending on a quantization mode information comprised by the data stream, one default transition table out of a set of default transition tables as the transition table to be used, each of which represents a surjective mapping from a domain of combinations of the set of transition states with the current residual level's characteristic onto the set of transition states, wherein the default transition tables differ in a cardinality of the set of transition states, wherein the cardinality is four or larger, and performing, whatever default transition table is selected as the transition table to be used, the selection of the quantizer by mapping, using a first mapping, a predetermined number of bits of the current transition state onto the default quantizers, the predetermined number and the first mapping being equal whatever default transition table is selected as the transition table to be used.

Another embodiment may have a method, comprising: predictively encoding a media signal to acquire a residual signal, sequentially quantizing residual values which represent the residual signal to acquire residual levels by selecting a quantizer out of a set of default quantizers depending on a current transition state, quantizing a current residual value using the quantizer to acquire a current residual level, applying a binary function onto the current residual level to acquire a current residual level's characteristic, and updating the current transition state depending on the current residual level's characteristic using a transition table to be used, encoding the residual levels into the data stream, selecting, depending on a quantization mode information transmitted in the data stream, one default transition table out of a set of default transition tables as the transition table to be used, each of which represents a surjective mapping from a domain of combinations of the set of transition states with the current residual level's characteristic onto the set of transition states, wherein the default transition tables differ in a cardinality of the set of transition states, wherein the cardinality is four or larger, and performing, whatever default transition table is selected as the transition table to be used, the selection of the quantizer by mapping, using a first mapping, a predetermined number of bits of the current transition state onto the default quantizers, the predetermined number and the first mapping being equal whatever default transition table is selected as the transition table to be used.

Another embodiment may have a data stream encoded by a method comprising: predictively encoding a media signal to acquire a residual signal, sequentially quantizing residual values which represent the residual signal to acquire residual levels by selecting a quantizer out of a set of default quantizers depending on a current transition state, quantizing a current residual value using the quantizer to acquire a current residual level, applying a binary function onto the current residual level to acquire a current residual level's characteristic, and updating the current transition state depending on the current residual level's characteristic using a transition table to be used, encoding the residual levels into the data stream, selecting, depending on a quantization mode information transmitted in the data stream, one default transition table out of a set of default transition tables as the transition table to be used, each of which represents a surjective mapping from a domain of combinations of the set of transition states with the current residual level's characteristic onto the set of transition states, wherein the default transition tables differ in a cardinality of the set of transition states, wherein the cardinality is four or larger, and performing, whatever default transition table is selected as the transition table to be used, the selection of the quantizer by mapping, using a first mapping, a predetermined number of bits of the current transition state onto the default quantizers, the predetermined number and the first mapping being equal whatever default transition table is selected as the transition table to be used.

Another embodiment may have a non-transitory digital storage medium having a computer program stored thereon to perform the method comprising: decoding residual levels, which represent a prediction residual, from a data stream, sequentially dequantizing the residual levels by selecting a quantizer out of a set of default quantizers depending on a current transition state, dequantizing a current residual level using the quantizer to acquire a dequantized residual value, applying a binary function onto the current residual level to acquire a current residual level's characteristic, and updating the current transition state depending on the current residual level's characteristic using a transition table to be used, reconstructing a media signal using the dequantized residual values, selecting, depending on a quantization mode information comprised by the data stream, one default transition table out of a set of default transition tables as the transition table to be used, each of which represents a surjective mapping from a domain of combinations of the set of transition states with the current residual level's characteristic onto the set of transition states, wherein the default transition tables differ in a cardinality of the set of transition states, wherein the cardinality is four or larger, and performing, whatever default transition table is selected as the transition table to be used, the selection of the quantizer by mapping, using a first mapping, a predetermined number of bits of the current transition state onto the default quantizers, the predetermined number and the first mapping being equal whatever default transition table is selected as the transition table to be used, when said computer program is run by a computer.

Another embodiment may have a non-transitory digital storage medium having a computer program stored thereon to perform the method comprising: predictively encoding a media signal to acquire a residual signal, sequentially quantizing residual values which represent the residual signal to acquire residual levels by selecting a quantizer out of a set of default quantizers depending on a current transition state, quantizing a current residual value using the quantizer to acquire a current residual level, applying a binary function onto the current residual level to acquire a current residual level's characteristic, and updating the current transition state depending on the current residual level's characteristic using a transition table to be used, encoding the residual levels into the data stream, selecting, depending on a quantization mode information transmitted in the data stream, one default transition table out of a set of default transition tables as the transition table to be used, each of which represents a surjective mapping from a domain of combinations of the set of transition states with the current residual level's characteristic onto the set of transition states, wherein the default transition tables differ in a cardinality of the set of transition states, wherein the cardinality is four or larger, and performing, whatever default transition table is selected as the transition table to be used, the selection of the quantizer by mapping, using a first mapping, a predetermined number of bits of the current transition state onto the default quantizers, the predetermined number and the first mapping being equal whatever default transition table is selected as the transition table to be used, when said computer program is run by a computer.

In accordance with a first aspect of the present invention, the inventors of the present application realized that one problem encountered when trying to use dependent quantization/dequantization of transform coefficient levels stems from the fact that a high implementation complexity is involved with providing multiple dependent quantization/dequantization modes. According to the first aspect of the present application, this difficulty is overcome by unifying a framework for independent quantization/dequantization and multiple variants of dependent quantization/dequantization. The inventors found, that it is advantageous to select a quantizer independent on a quantization mode information. The only aspect that depends on the quantization mode information is an updating of a current transition state, e.g., a selection of a transition table usable for the updating. This is based on the idea that a unified process for all supported quantization modes, introduces nearly no additional implementation complexity at the decoder side relative to supporting a single quantization mode. But the decoder complexity would increase if different methods have to be supported. Thus, the usage of different quantization modes is enabled, whereby an encoder is given the freedom to select the variant that provides the most suitable trade-off between coding efficiency and implementation complexity for its application area. Furthermore, the selection of a quantizer, independent of the quantization mode, enables a usage of dependent quantization mode with more than 4 transition states at an encoder/decoder, whereby the coding efficiency can be increased since a denser packing of the admissible reconstruction points in the N-dimensional signal space is achieved.

Accordingly, in accordance with a first aspect of the present application, a decoder is configured to decode residual levels, which represent a prediction residual, from a data stream, and sequentially dequantize the residual levels by selecting a quantizer out of a set of default quantizers depending on a current transition state, dequantizing a current residual level using the quantizer to obtain a dequantized residual value, applying a binary function onto the current residual level to obtain a current residual level's characteristic, e.g., a parity, and updating the current transition state depending on the current residual level's characteristic using a transition table to be used. The dequantization of the residual levels is performed sequentially meaning that the above described dequantization steps are performed in loops, e.g., until all residual values are dequantized, for which reason the updating of the current transition state might either be understood as a first step or a last step in the sequence. The step, updating of the current transition state, connects consecutive dequantizations of residual levels, e.g., a dequantization of a previous residual level is connected with a dequantization of the current residual level by updating of the current transition state. Furthermore, e.g., in case of a dequantization of a first residual level the current transition state might be set to a default/predetermined state, e.g., zero, and this current transition state is updated depending on the current residual level's characteristic, i.e. a characteristic of the first residual level, using a transition table to be used, e.g., to initialize the sequential dequantization of the residual levels. The decoder is configured to reconstruct a media signal using the dequantized residual values. Additionally, the decoder is configured to select, depending on a quantization mode information contained in the data stream, one default transition table out of a set of default transition tables as the transition table to be used, each of which represents a surjective mapping from a domain of combinations of the set of one or more transition states with the current residual level's characteristic onto the set of one or more transition states, wherein the default transition tables differ in a cardinality of the set of one or more transition states. The surjective mapping, e.g., maps an element, i.e. a transition state, of the set of one or more transition states onto an element, i.e. a transition state, of the set of one or more transition states. The domain and the codomain for the surjective mapping both, e.g., relate to the same set of one or more transition states. This selection of the transition table to be used, for example, might be performed for each residual level at the updating of the current transition state, might be performed per transform block comprising multiple residual levels or might be performed picture wise. Additionally, the decoder is configured to perform, whatever default transition table is selected as the transition table to be used, the selection of the quantizer by mapping, using a first mapping, a predetermined number of bits of the current transition state onto the default quantizers, the predetermined number and the first mapping being equal whatever default transition table is selected as the transition table to be used. The predetermined number of bits represents, e.g., a number of one or more bits at one or more predetermined bit positions such as the LSB or the bit at the second but last significant bit position.

Accordingly, in accordance with a first aspect of the present application, a decoder is configured to decode residual levels, which represent a prediction residual, from a data stream, and sequentially dequantize the residual levels by selecting a quantizer out of a set of default quantizers depending on a current transition state, dequantizing a current residual level using the quantizer to obtain a dequantized residual value, and updating the current transition state depending on a current residual level's characteristic obtained by an application of a binary function onto the current residual level, e.g. parity, and depending on a quantization mode information contained in the data stream. As described above, the dequantization of the residual levels is performed sequentially meaning that the above described dequantization steps are performed in loops, e.g., until all residual values are quantized, for which reason the updating of the current transition state might either be understood as a first step or a last step in the sequence. The step, updating of the current transition state, connects consecutive dequantizations of residual levels, e.g., a dequantization of a previous residual level is connected with a dequantization of the current residual level by the updating of the current transition state. Furthermore, e.g., in case of a dequantization of a first residual level the current transition state might be set to a default/predetermined state, e.g., zero, and this current transition state is updated depending on the current residual level's characteristic, i.e. a characteristic of the first residual level, e.g., to initialize the sequential dequantization of the residual levels. The current transition state transitions, e.g., at the updating, according to a surjective mapping which depends on the quantization mode information, from a domain of combinations of a set of one or more transition states with the current residual level's characteristic onto the set of one or more transition states, wherein a cardinality of the set of one or more transition states differs depending on the quantization mode information. Whatever the quantization mode information is, e.g. irrespective of, or independent from, the quantization mode information, the decoder is configured to perform the selection of the quantizer by mapping, using a first mapping, a predetermined number of bits (e.g. one or more bits at one or more predetermined bit positions such as the LSB or the bit at the second but last significant bit position) of the current transition state onto the default quantizers, the predetermined number and the first mapping being equal whatever the quantization mode information is. Additionally, the decoder is configured to reconstruct a media signal using the dequantized residual values.

Accordingly, in accordance with a first aspect of the present application, an encoder is configured to predictively encode a media signal to obtain a residual signal and sequentially quantize residual values which represent the residual signal to obtain residual levels by selecting a quantizer out of a set of default quantizers depending on a current transition state, quantizing a current residual value using the quantizer to obtain a current residual level, applying a binary function onto the current residual level to obtain a current residual level's characteristic, e.g., parity, and updating the current transition state depending on the current residual level's characteristic using a transition table to be used. The quantization of the residual levels is performed sequentially meaning that the above described quantization steps are performed in loops, e.g., until all residual values are quantized, for which reason the updating of the current transition state might either be understood as a first step or a last step in the sequence. The step, updating of the current transition state, connects consecutive quantizations of residual levels, e.g., a quantization of a previous residual level is connected with a quantization of the current residual level by updating of the current transition state. Furthermore, e.g., in case of a quantization of a first residual level the current transition state might be set to a default/predetermined state, e.g., zero, and this current transition state is updated depending on the current residual level's characteristic, i.e. a characteristic of the first residual level, using a transition table to be used, e.g., to initialize the sequential quantization of the residual levels. The encoder is configured to encode the residual levels into the data stream. Additionally, the encoder is configured to select, depending on a quantization mode information transmitted in the data stream, one default transition table out of a set of default transition tables as the transition table to be used, each of which represents a surjective mapping from a domain of combinations of the set of one or more transition states with the current residual level's characteristic onto the set of one or more transition states, wherein the default transition tables differ in a cardinality of the set of one or more transition states. The surjective mapping, e.g., maps an element, i.e. a transition state, of the set of one or more transition states onto an element, i.e. a transition state, of the set of one or more transition states. The domain and the codomain for the surjective mapping both, e.g., relate to the same set of one or more transition states. This selection of the transition table to be used, for example, might be performed for each residual level at the updating of the current transition state, might be performed per transform block comprising multiple residual levels or might be performed picture wise. Additionally, the encoder is configured to perform, whatever default transition table is selected as the transition table to be used, the selection of the quantizer by mapping, using a first mapping, a predetermined number of bits of the current transition state onto the default quantizers, the predetermined number and the first mapping being equal whatever default transition table is selected as the transition table to be used. The predetermined number of bits represents, e.g., a number of one or more bits at one or more predetermined bit positions such as the LSB or the bit at the second but last significant bit position.

Accordingly, in accordance with a first aspect of the present application, an encoder is configured to predictively encode a media signal to obtain a residual signal and sequentially quantize residual values which represent the residual signal to obtain residual levels by selecting a quantizer out of a set of default quantizers depending on a current transition state, quantizing a current residual value using the quantizer to obtain a current residual level, and updating the current transition state depending on a current residual level's characteristic obtained by an application of a binary function onto the current residual level, e.g., parity, and depending on a quantization mode information transmitted in the data stream. As described above, the quantization of the residual levels is performed sequentially meaning that the above described quantization steps are performed in loops, e.g., until all residual values are quantized, for which reason the updating of the current transition state might either be understood as a first step or a last step in the sequence. The step, updating of the current transition state, connects consecutive quantizations of residual levels, e.g., a quantization of a previous residual level is connected with a quantization of the current residual level by the updating of the current transition state. Furthermore, e.g., in case of a quantization of a first residual level the current transition state might be set to a default/predetermined state, e.g., zero, and this current transition state is updated depending on the current residual level's characteristic, i.e. a characteristic of the first residual level, e.g., to initialize the sequential quantization of the residual levels. The current transition state transitions, e.g., at the updating, according to a surjective mapping which depends on the quantization mode information, from a domain of combinations of a set of one or more transition states with the current residual level's characteristic onto the set of one or more transition states, wherein a cardinality of the set of one or more transition states differs depending on the quantization mode information. Whatever the quantization mode information is, e.g. irrespective of, or independent from, the quantization mode information, the decoder is configured to perform the selection of the quantizer by mapping, using a first mapping, a predetermined number of bits (e.g. one or more bits at one or more predetermined bit positions such as the LSB or the bit at the second but last significant bit position) of the current transition state onto the default quantizers, the predetermined number and the first mapping being equal whatever the quantization mode information is. Additionally, the encoder is configured to encode the residual levels into the data stream.

Accordingly, in accordance with a first aspect of the present application, a method comprises decoding residual levels, which represent a prediction residual, from a data stream, and sequentially dequantizing the residual levels by selecting a quantizer out of a set of default quantizers depending on a current transition state, dequantizing a current residual level using the quantizer to obtain a dequantized residual value, and updating the current transition state depending on a current residual level's characteristic obtained by an application of a binary function onto the current residual level, e.g. parity, and depending on a quantization mode information contained in the data stream. Additionally, the method comprises reconstructing a media signal using the dequantized residual values. The current transition state transitions, according to a surjective mapping which depends on the quantization mode information, from a domain of combinations of a set of one or more transition states with the current residual level's characteristic onto the set of one or more transition states, wherein a cardinality of the set of one or more transition states differs depending on the quantization mode information. Furthermore, the method comprises performing, whatever the quantization mode information is, e.g. irrespective of, or independent from, the quantization mode information, the selection of the quantizer by mapping, using a first mapping, a predetermined number of bits (e.g. one or more bits at one or more predetermined bit positions such as the LSB or the bit at the second but last significant bit position) of the current transition state onto the default quantizers, the predetermined number and the first mapping being equal whatever the quantization mode information is.

Accordingly, in accordance with a first aspect of the present application, a method comprises predictively encoding a media signal to obtain a residual signal and sequentially quantizing residual values which represent the residual signal to obtain residual levels by selecting a quantizer out of a set of default quantizers depending on a current transition state, quantizing a current residual value using the quantizer to obtain a current residual level, and updating the current transition state depending on a current residual level's characteristic obtained by an application of a binary function onto the current residual level, e.g. parity, and depending on a quantization mode information transmitted in the data stream. Additionally, the method comprises encoding the residual levels into the data stream. The current transition state transitions, according to a surjective mapping which depends on the quantization mode information, from a domain of combinations of a set of one or more transition states with the current residual level's characteristic onto the set of one or more transition states, wherein a cardinality of the set of one or more transition states differs depending on the quantization mode information. Furthermore, the method comprises performing, whatever the quantization mode information is, e.g. irrespective of, or independent from, the quantization mode information, the selection of the quantizer by mapping, using a first mapping, a predetermined number of bits (e.g. one or more bits at one or more predetermined bit positions such as the LSB or the bit at the second but last significant bit position) of the current transition state onto the default quantizers, the predetermined number and the first mapping being equal whatever the quantization mode information is.

The methods as described above are based on the same considerations as the above-described encoders/decoders. The methods can, by the way, be completed with all features and functionalities, which are also described with regard to the encoders/decoders.

An embodiment is related to a data stream having a picture or a video encoded thereinto using a herein described method for encoding.

An embodiment is related to a computer program having a program code for performing, when running on a computer, a herein described method.

4 BRIEF DESCRIPTION OF THE DRAWINGS

Embodiments of the present invention will be detailed subsequently referring to the appended drawings, in which:

FIG. 4 shows a Pseudo-code illustrating a reconstruction process of transform coefficients for a transform block;

FIG. 5 shows a state transition table;

FIG. 11 shows a Pseudo-code illustrating the reconstruction process of transform coefficients for a transform block, according to an embodiment;

5 DETAILED DESCRIPTION OF THE INVENTION

Figures 1, 2, 3:
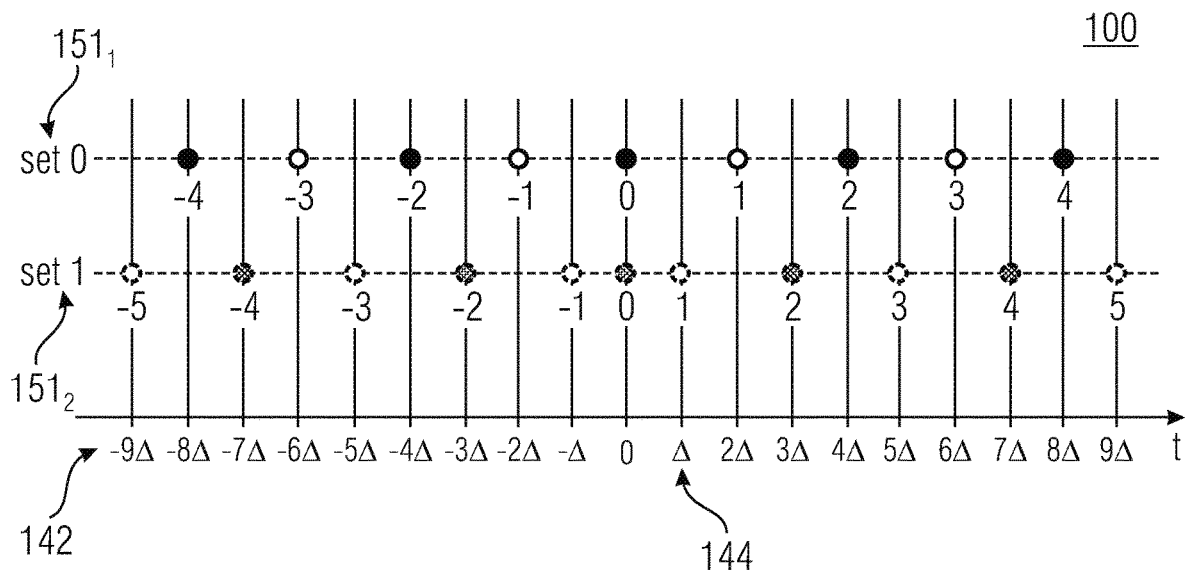
FIG. 1 shows two different quantizer.
FIG. 2 shows a Pseudo-code illustrating a reconstruction process for transform coefficients.
FIG. 3 shows a Pseudo-code illustrating an alternative implementation of a reconstruction process for transform coefficients.

Equal or equivalent elements or elements with equal or equivalent functionality are denoted in the following description by equal or equivalent reference numerals even if occurring in different figures.

In the following description, a plurality of details is set forth to provide a more throughout explanation of embodiments of the present invention. However, it will be apparent to those skilled in the art that embodiments of the present invention may be practiced without these specific details. In other instances, well-known structures and devices are shown in block diagram form rather than in detail in order to avoid obscuring embodiments of the present invention. In addition, features of the different embodiments described herein after may be combined with each other, unless specifically noted otherwise.

The embodiments in the following will mostly illustrate the features and functionalities in view of a decoder. However, it is clear that the same or similar features and functionalities can be comprised by an encoder, e.g., a decoding performed by a decoder can correspond to an encoding by the encoder. Furthermore, the encoder might comprise the same features as described with regard to the decoder in a feedback loop, e.g., in the prediction stage 36.

Figure 8:
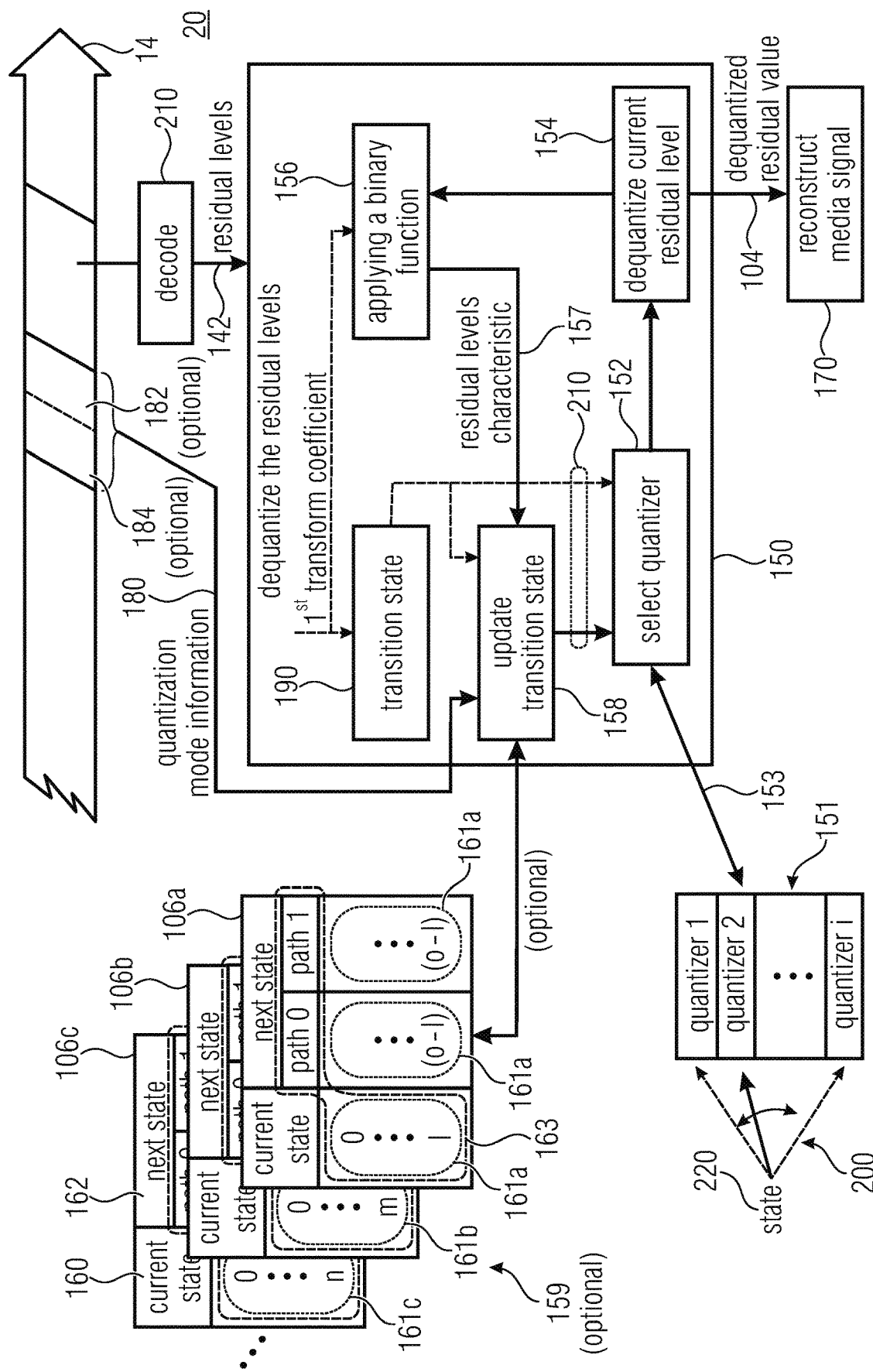
FIG. 8 shows a decoder, according to an embodiment.

FIG. 8 shows an embodiment of a decoder 20. The decoder 20 might optionally comprise features and/or functionalities as described in section 2 (e.g., one or more features described in sections 2.1 to 2.3).

The decoder 20 is configured to decode 210 residual levels 142, which represent a prediction residual, from a data stream 14. The residual levels 142 might be quantization levels of transform coefficients representing the prediction residual. As shown in FIG. 1, the residual levels 142 might represent integer multiples of a quantization step size 144.

Figure 6:
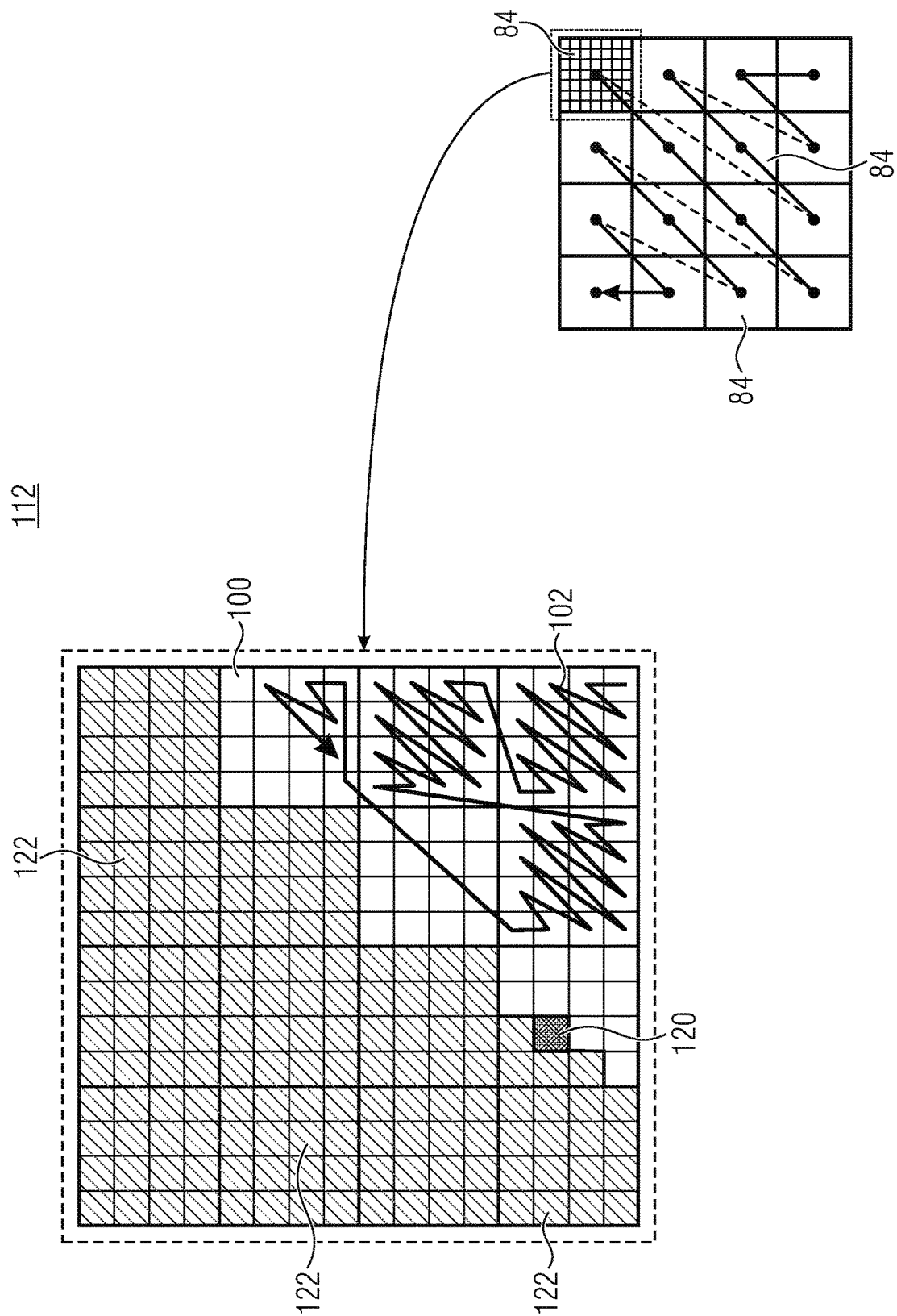
FIG. 6 shows coding orders.

The decoder 20 is configured to sequentially dequantize 150 the residual levels 142. The residual levels 142 might be dequantized 150 along a coding order, i.e. a scan order or reconstruction order. Different coding orders are possible and the coding order might depend on a media signal, e.g., a picture signal, a video signal or an audio signal, to be decoded by the decoder 20. FIG. 6 shows an example of a coding order 102 which might be used for decoding picture or video signals. According to an embodiment, the decoder 20 might dequantize 150 the residual levels 142 starting with dequantizing 150 a first non-zero transform coefficient, i.e., a first transform coefficient with a residual level unequal to zero in coding order, and proceeding with dequantizing 150 the residual levels 142 of the subsequent transform coefficients in coding order up to a last transform coefficient in coding order. The residual levels of transform coefficients preceding the first non-zero quantization index in coding order might be inferred to be equal to 0 by the decoder 20.

The decoder 20 is configured to sequentially dequantize 150 the residual levels 142 by selecting 152 a quantizer 153 out of a set 151 of default quantizers depending on a current transition state 220, dequantizing 154 a current residual level using the quantizer 153 to obtain a dequantized residual value 104, and updating 158 the current transition state depending on a current residual level's characteristic 157 obtained by an application 156 of a binary function onto the current residual level, and depending on a quantization mode information 180 contained in the data stream 14. A current residual level is dequantized 154 to obtain a dequantized residual value 104, wherein the quantizer 153 used for the dequantization 154 depends on the current transition state 220. After this dequantization 154 the current transition state is updated 158 to obtain a new current transition state, e.g., for dequantizing the next residual level or for dequantizing the current residual level again with an updated current transition state (see, for example, the dequantization 150 of a first residual level below). The new current transition state, e.g., depends on the current transition state and on the current residual level's characteristic 157. The current residual level's characteristic 157 might represent the characteristic of the current residual level and not of the next residual level. The transition state for a particular transform coefficient might depend on the transition state for the previous transform coefficient in coding order and the residual levels characteristic 157 of the previous transform coefficient.

Figure 10:
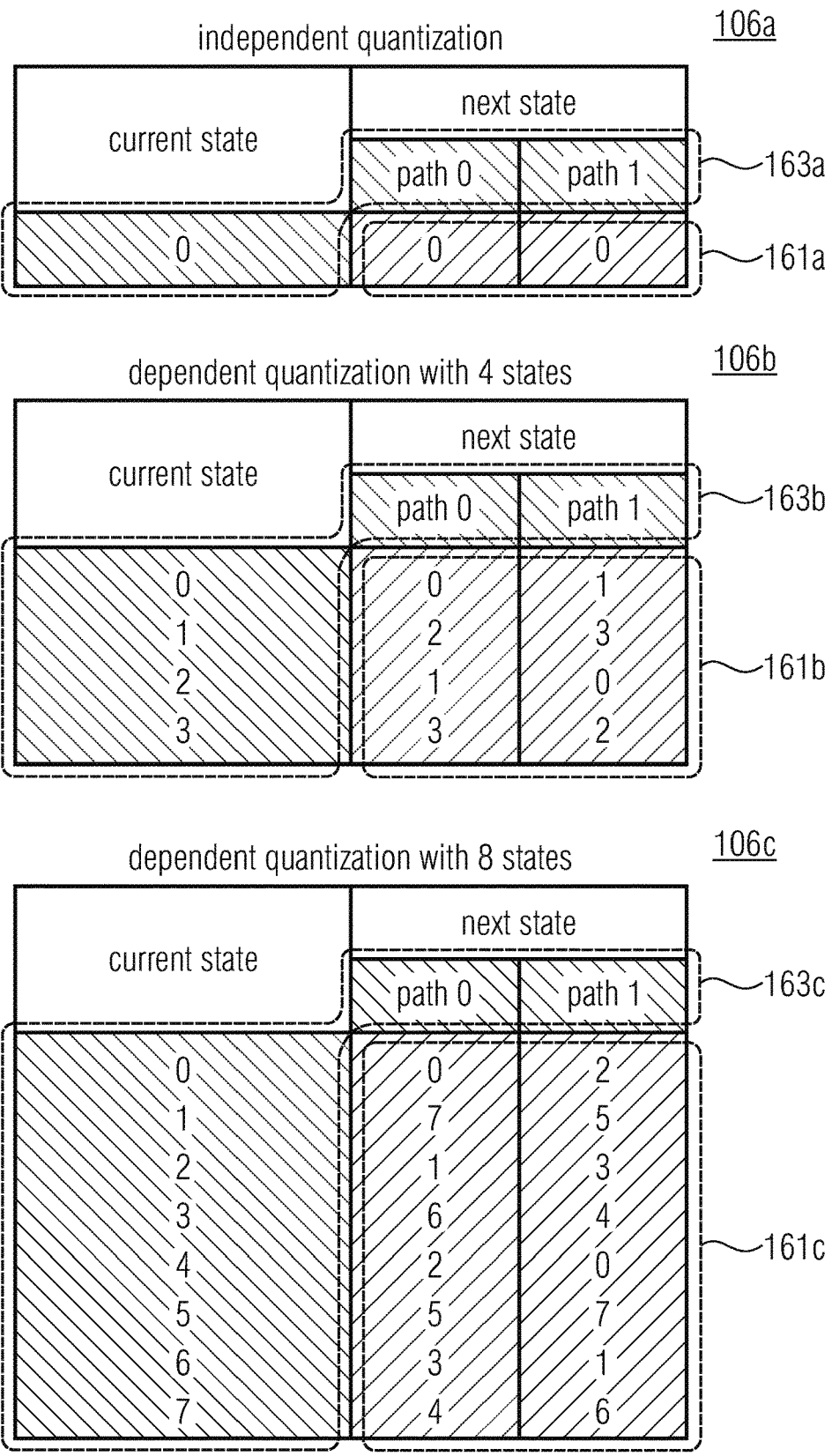
FIG. 10 shows transition tables, according to an embodiment.

At the updating 158, the current transition state transitions, according to a surjective mapping which depends on the quantization mode information 180, from a domain of combinations 163 of a set 161 of one or more transition states with the current residual level's characteristic 157 onto the set 161 of one or more transition states, wherein a cardinality l,m,n of the set 161 of one or more transition states differs depending on the quantization mode information 180. For example, the set 161a of one or more transition states has a cardinality l in case of a first quantization mode being indicated by the quantization mode information 180, the set 161b of one or more transition states has a cardinality m in case of a second quantization mode being indicated by the quantization mode information 180 and the set 161c of one or more transition states has a cardinality n in case of a third quantization mode being indicated by the quantization mode information 180. According to an embodiment, the decoder 20 might be configured to either use a set 161a of one or more transition states with a cardinality l, e.g., with l=1, or a set 161b of one or more transition states with a cardinality m, e.g., with m=4, depending on the quantization mode information 180. FIG. 10 shows three possible surjective mappings 106a, 106b and 106c.

According to an embodiment, the binary function is the parity.

In FIG. 8 the binary function might be referred to as 'path' and a first residual levels characteristic might be associated with 'path 0' and a second residual levels characteristic might be associated with 'path 1'. According to an embodiment, the decoder 20 is configured to obtain as the residual levels characteristic 157 a parity of the residual level. The decoder might be configured to determine whether the residual level has an even parity or an odd parity by applying 156 the binary function onto the current residual level. For example, 'path 0' might correspond to an even parity and 'path 1' might correspond to an odd parity.

As shown in FIG. 8, the decoder 20 is configured to perform, whatever the quantization mode information 180 is, e.g. irrespective of, or independent from, the quantization mode information 180, the selection 152 of the quantizer 153 by mapping, using a first mapping 200, a predetermined number of bits of the current transition state 220 onto the default quantizers, the predetermined number and the first mapping 200 being equal whatever the quantization mode information 180 is. The predetermined number of bits indicates, for example, one or more bits of the current transition state 220 at one or more predetermined bit positions such as the LSB or the bit at the second but last significant bit position.

According to an embodiment, the set 151 of default quantizers consists, as shown in FIG. 1, of a first default quantizer $151_1$ comprising as reconstruction levels 142 even integer multiples of a quantization step size 144, and a second default quantizer $151_2$ comprising as reconstruction levels 142 odd integer multiples of the quantization step size 144 and zero.

According to an embodiment, the first mapping 200 maps a current transition state 220 equal to one or smaller than one onto the first default quantizer $151_1$ and a current transition state 220 greater than one onto the second default quantizer $151_2$. The predetermined number of bits might be one and the decoder 20 might be configured to map the second bit, e.g., the second LSB, of the current transition state 220 onto the first default quantizer or onto the second default quantizer.

The decoder 20, shown in FIG. 8, is configured to reconstruct 170 a media signal using the dequantized residual values 104. According to an embodiment, the decoder 20 is configured to perform the reconstruction 170 by performing a prediction to obtain a predicted version of the media signal, and correcting the predicted version using the dequantized residual values 104, or to reconstruct the media signal using the dequantized residual values 104 by performing a prediction to obtain a predicted version of the media signal, subjecting the dequantized residual values 104 to a reverse transformation to obtain a media residual signal, and correcting the predicted version using the media residual signal.

As described above, the residual levels 142 are sequentially dequantized 150. Different options exist for dequantizing 150 the first residual level, i.e. the residual level of the first non-zero transform coefficient, wherein the decoder 20 might be configured to use one of the options.

The decoder 20 might be configured to set 190 the current transition state for the first residual level being the current residual level to a predetermined value. For example, the predetermined value might be zero. The selection 152 of the quantizer 153 might be performed based on this predefined current transition state and the first residual level is, e.g., dequantized 154 using the selected quantizer 153. Then the decoder 20 might be configured to apply 156 the binary function to the first residual level to obtain the characteristic of the first residual level as the current residual level's characteristic 157 and update 158 the current transition state depending on the current residual level's characteristic 157. According to a first option, the decoder 20 might be configured to use the updated transition state as the current transition state to perform the dequantization 150 for the next residual level. According to a second option, the decoder 20 is configured to perform the dequantisation 150 of the first residual level again using the updated transition state as the current transition state before proceeding to dequantizing 150 the next residual level. Alternatively, according to a third option, the decoder 20 might be configured to set 190 the current transition state for the first residual level being the current residual level to a predetermined value and apply 156 the binary function to the first residual level to obtain the characteristic of the first residual level as the current residual level's characteristic 157. For example, the predetermined value might be zero. Then the decoder 20 is configured to update 158 the predefined current transition state depending on the current residual level's characteristic 157 to obtain the current transition state. The selection 152 of the quantizer 153 might be performed based on this current transition state and the first residual level is, e.g., dequantized 154 using the selected quantizer 153. Then the decoder 20 might be configured to perform the updating 158 again to obtain the current transition state for the next residual level.

According to an embodiment, the decoder 20 is configured to use a transition table 106 to be used for the updating 158 of the current transition state. For example, the decoder 20 is configured to sequentially dequantize 150 the residual levels 142 by selecting 152 a quantizer 153 out of the set 151 of default quantizers depending on a current transition state, dequantizing 154 a current residual level using the quantizer 153 to obtain a dequantized residual value 104, applying 156 a binary function onto the current residual level to obtain a current residual level's characteristic 157, and updating 158 the current transition state depending on the current residual level's characteristic 157 using the transition table 106 to be used. The decoder might be configured to select, depending on the quantization mode information 180 contained in the data stream 14, one default transition table out of a set 159 of default transition tables 106a,b,c as the transition table 106 to be used, each of which represents a surjective mapping from a domain of combinations 163 of the set 161 of one or more transition states with the current residual level's characteristic 157 onto the set 161 of one or more transition states, wherein the default transition tables differ in the cardinality l,m,n of the set 161 of one or more transition states. Additionally, the decoder 20, for example, is configured to perform, whatever default transition table is selected as the transition table to be used, the selection 152 of the quantizer by mapping, using the first mapping 200, the predetermined number of bits of the current transition state 220 onto the default quantizers, the predetermined number and the first mapping 200 being equal whatever default transition table is selected as the transition table to be used.

According to an embodiment, the set 159 of default transition tables 106a,b,c comprises two or more of
  a first default transition table 106a for which the cardinality of the set of one or more transition states is one,
  a second default transition table 106b for which the cardinality of the set of one or more transition states is four,
  a third default transition table 106c for which the cardinality of the set of one or more transition states is eight.

According to an embodiment, the set 159 of default transition tables 106a,b,c comprises a first default transition table 106a for which the cardinality of the set of one or more transition states is one, and a second default transition table 106b for which the cardinality of the set of one or more transition states is four.

In other words, depending on the quantization mode information 180, the surjective mapping and the cardinality l,m,n of the set 161 of one or more transition states is selectable between two or more of the cardinality l of the set 161a of one or more transition states is one, the cardinality m of the set 161b of one or more transition states is four, and the cardinality n of the set 161c of one or more transition states is eight. According to an embodiment, the surjective mapping and the cardinality l,m,n of the set 161 of one or more transition states is selectable between the cardinality l of the set 161a of one or more transition states is one, and the cardinality m of the set 161b of one or more transition states is four.

According to an embodiment, the decoder 20 is configured to manage the set 159 of default transition tables 106a,b,c as different portions of a unified transition table within which, for each default transition table 106a,b,c, each of the set 161 of one or more transition states is indexed using a state index different from state indices using which any other default transition table is indexed in the unified transition table, e.g., the transition states of the default transition tables in the different portions of the unified transition table, are disjoint from one default transition table to another.

According to an embodiment, the decoder 20 is configured to perform the updating 158 of the current transition state 220, e.g., depending on the current residual level's characteristic 157 using the transition table 106 to be used onto the next transition state 162 for a residual level to be dequantized next, by looking-up in the unified transition table an entry which corresponds to a combination 163 of the current residual level's characteristic 157 and the current transition state 220.

According to an embodiment, the quantization mode information 180 comprises a syntax element in the data stream indicative of a starting transition state for use in dequantizing a, in a dequantization order, e.g., along which the sequential dequantization is performed, first residual level, so that the syntax element indicates the transition table to be used out of the default transition tables by virtue of fitting to a state index only used in the portion of the unified transition table corresponding to the transition table to be used.

According to an embodiment, the media signal is a video and the decoder 20 is configured to read the quantization mode information 180 from the data stream 14 and perform the selection of the one default transition table 106 out of the set of default transition tables in a manner of one of once for the video, picture block wise, on a per picture basis, on a per slice basis, and on a per picture sequence basis.

In other words, the decoder 20 might be configured to read the quantization mode information 180 which controls the updating in a manner of one of for the video, picture block wise, on a per picture basis, on a per slice basis, and on a per picture sequence basis.

According to an embodiment, the media signal is a color video and the decoder 20 is configured to use a different version for the set 151 of default quantizers for different colour components.

The decoder 20 and/or a corresponding encoder might comprise features and/or functionalities as described with respect to one or more of the following embodiments.

The present invention specifies a decoder, an encoder and a method by which multiple variants of dependent quantization are supported in a unified framework. The invention particularly describes a concept, in which the entropy decoding and reconstruction process, e.g., the reconstruction 170 of the media signal, is basically the same for all supported quantization methods, i.e. independent of the quantization mode information 180, e.g., only the state transition table 106 is chosen based on the quantization method selected by an encoder and signaled inside the bitstream, i.e. the data stream 14. In an embodiment of the invention, three quantization methods are supported, which might be indicated by the quantization mode information 180:
  conventional independent scalar quantization;
  dependent quantization with 4 states, i.e. transition states; and
  dependent quantization with 8 states, i.e. transition states.

In another embodiment, additional variants of dependent quantization with more than 8 states (e.g., 16 states) are supported. In another embodiment of the invention, only conventional quantization and a version of dependent quantization with more than 4 states are supported. In another embodiment, two or more variants of dependent quantization, all with more than 4 states are supported. According to another Aspect, only the conventional quantization and the dependent quantization with 4 states are supported.

An aspect of the invention is that all decoder operations are designed in a way that they are independent of the quantization method actually used. The aspect that might depend on the quantization method chosen is the selection of the state transition table 106. Once the state transition table 106 is given, the decoding process is independent of the quantization method selected.

The advantages of the invention are the following:
- by supporting dependent quantization with more than 4 states, the coding efficiency can be increased since a denser packing of the admissible reconstruction points in the N-dimensional signal space is achieved (this has been shown in the literature).
- by supporting different variants of dependent quantization (which deviate in the number of states), an encoder is given the freedom to select the variant that provides the most suitable trade-off between coding efficiency and implementation complexity for its application area. Note, that the encoder complexity depends on the number of supported quantization states, i.e. depends on the cardinality l,m,n of the set 161 of one or more transition states. While dependent quantization with 8 states yields a higher coding efficiency than dependent quantization with 4 states, it also requires a higher encoder complexity.
- by designing a unified decoder process for all quantization methods supported, basically no additional implementation complexity at the decoder side is required. Note that the decoding complexity is virtually independent of the number of quantization states. But the decoder complexity would increase if different methods have to be supported. By unifying the decoding process for all quantization methods supported, the implementation complexity for a decoder is virtually unchanged relative to supporting a single method of dependent quantization.

5.1 Basic Concept of the Invention

In VTM-7, dependent quantization with 4 states and the following state transition table 106 is specified, e.g., representing a state transition table 106*b* with the set 161*b* of one or more transition states with a cardinality m being four:

| current state | next state | |
|---|---|---|
| | path 0 | path 1 |
| 0 | 0 | 2 |
| 1 | 2 | 0 |
| 2 | 1 | 3 |
| 3 | 3 | 1 |

In VTM-5, the path is given by the parity of the current transform coefficient level, i.e. current residual level (or quantization index), in coding order 102. With level[k] denoting the current transform coefficient level, the variable path is determined according to path=(level[k] & 1), where "&" denotes the bit-wise "and" operator in two-complement's arithmetic. As noted above, the path can be any binary function of the quantization index. Nonetheless, using the parity is advantageous.

In the decoding process of VTM-7, a number of operations depend on the state variable, i.e. the transition state. In particular the following three aspects:

The quantizer 153 chosen for reconstructing a transform coefficient depends on the current transition state 220. In VTM-7, the quantizer id (which can be zero or one) is given by QId=state>>1.

Given the current value of the state variable state and the current quantization index level[k], the reconstructed transform coefficient trec[k], i.e. the dequantized residual value 104, is obtained by

```
if( level [k] != 0) {
    n = 2 * level [k] + (level[k] > 0 ? -(state>>1) : (state>>1)
    trec[k] =( n * scale[k] + add) >> shift
} else {
    trec[k] = 0
}
``` where the second line inside the if-branch specifies an integer variant of the multiplication with the quantization step size 144. The expression (state>>1) specifies the quantizer 153 used, e.g., the expression (state>>1) represents the first mapping 200. The operator ">>" specifies a bit shift to the right.

Figure 9:
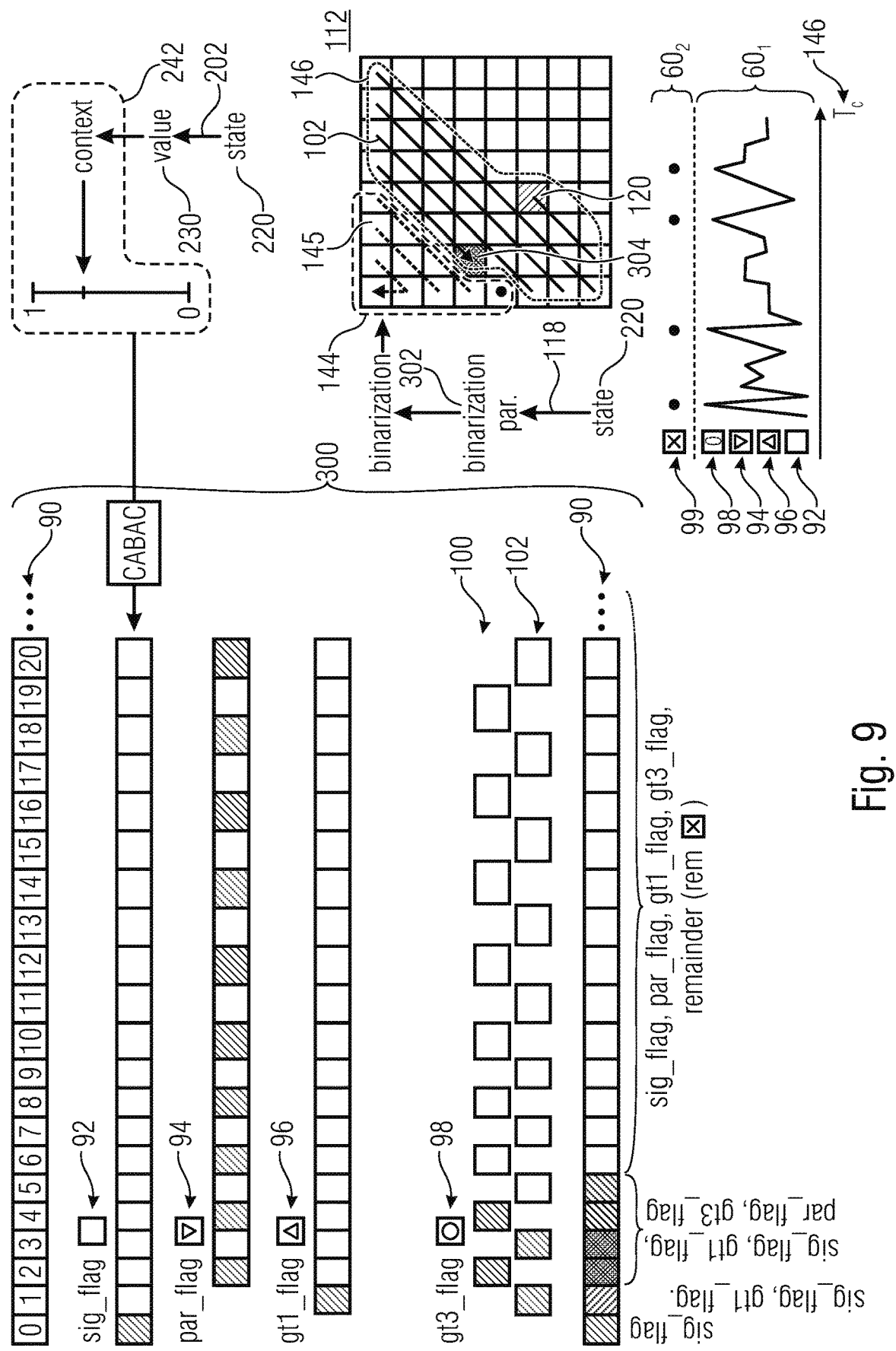
FIG. 9 shows an embodiment for context-adaptive binary arithmetic coding (CABAC) of a significance bin.

The context model, i.e. the context 242, for coding the significance flag, i.e. the significance bin 92, depends on the state variable, i.e. the current transition state 220, see FIG. 9. In VTM-7, it depends on the value 230 of max(state-1, 0) and optionally on other variables. It can be interpreted in a way that three different sets of context models 242 are used. The first set is used for transform coefficients levels, i.e. residual levels 142, for which the state variable 220 is equal to 0 or 1; the second set is used for transform coefficients levels 142 for which the state variable 220 is equal to 2; and the third set is used for transform coefficients levels 142 for which the state variable 220 is equal to 3.

The parameter pos0, e.g. representing a binarization parameter 302, for coding the syntax element dec_abs_level (transform coefficient levels that are coded in bypass mode) depends on the quantization state, i.e. the transition state assigned to the respective residual level. In VTM-7, the variable pos0 is determined according to pos0=(state<2?1:2)<<RPabs where RPabs specifies the Rice parameter that is chosen based on the sum of absolute transform coefficients in the local neighborhood.

5.1.1 Adding Another Variant of Dependent Quantization

Now, as an example, an additional variant of dependent quantization with 8 states should be supported in by the bitstream syntax and decoding process. That variant might use the following state transition table 106*c*, e.g., with the set 161*c* of one or more transition states with a cardinality n being eight:

| current state | next state | |
|---|---|---|
| | path 0 | path 1 |
| 0 | 0 | 1 |
| 1 | 4 | 5 |
| 2 | 1 | 0 |
| 3 | 5 | 4 |
| 4 | 7 | 6 |
| 5 | 3 | 2 |

-continued

| current state | next state | |
|---|---|---|
| | path 0 | path 1 |
| 6 | 6 | 7 |
| 7 | 2 | 3 |

For this variant, the quantizer 153 is given by QId=state>>2.

Conceptually, two quantizers that deviate from the ones chosen in VTM-7 could be advantageous.

For coding the significance flag 92, see FIG. 9, more than 3 different context sets 242 might be advantageous. Using the same relationship as for the 4-state variant (i.e., min (state-1,0)), we would require 7 context sets 242. The number of context sets 242 could be restricted to 3, but then a different rule as for the 4-state variant has to be used.

Furthermore, the derivation of the pos0 variable, i.e. the binarization parameter 302, (for coding the dec_abs_level) in VTM-7 depends on the quantizer 153 used. For the first quantizer $151_1$, it is set equal to pos0=1<<RPabs, while for the second quantizer $151_2$, it is set equal to pos0=2<<RPabs.

Hence, a different implementation would be required for the 8-state variant.

5.1.2 Unification of the Decoding Process

The idea of the proposed concept is to unify the decoding process for all quantization variants supported. The quantization variant for a residual level might be indicated by the quantization mode information 180. A first observation that allows a unification is that we can re-label the quantization states, i.e. the transition states, without impacting the result of the reconstruction process. For example, the VTM-7 state transition table given by

| current state | next state | |
|---|---|---|
| | path 0 | path 1 |
| 0 | 0 | 2 |
| 1 | 2 | 0 |
| 2 | 1 | 3 |
| 3 | 3 | 1 | can be rewritten to

| current state | next state | |
|---|---|---|
| | path 0 | path 1 |
| 0 | 0 | 1 |
| 1 | 2 | 3 |
| 2 | 1 | 0 |
| 3 | 3 | 2 |

Here, we swapped the meaning of states 1 and 2. While for the original table, the quantizer 153 is given by QId=state>>1. For the re-formulated table 106, the quantizer 153 is given by QId=state & 1, where "&" represents a bit-wise "and" operator.

In a similar way, the state transition table 106 for the 8-state version (or any other variant of dependent quantization) can be re-formulated, so that we can use the same relationship, i.e the first mapping 200, for deriving the quantizer id, i.e the quantizer 153 to be used.

For further unifying the decoding process, we have to make a compromise between coding efficiency and implementation complexity. For example, for entropy coding of the significance flag 92, we cannot choose the best version for all supported quantizer variants, but we can design a unified version, even though it is sub-optimal for some of the supported variants of dependent quantization.

5.1.3 Signaling of the Quantization Variant Selected

Finally, the quantizer variant selected, i.e. the quantizer 153 to be used, has to be indicated inside the bitstream, i.e. the data stream 14. For that purpose, multiple variations are possible:

it can be selected on a block level (e.g., per coding tree unit or coding unit), in which case a dedicated syntax element has to be transmitted for each of the corresponding blocks;

it can be selected on a slice or picture level (or tile or tile group level), in which case a dedicated syntax element has to be transmitted in a slice or picture header (or for a tile or tile group);

it can be selected on a sequence level, in which case a dedicated syntax element has to be transmitted in the sequence parameter set or a similar syntax structure.

In an embodiment, different quantizers may be used for different color components (e.g., different quantizers may be used for luma and chroma).

5.2 Description of a Particular Embodiment

In the following, an embodiment of the invention is described in more detail. It should, however, be noted that other embodiments are possible (as noted above and partly described below). The invention is not restricted to the particular design described in the following.

The invention is characterized by a combination of two or more of the following aspects:

bitstream syntax and decoding process that support independent quantization and one or more variants of dependent quantization, where at least one variant of dependent quantization uses 4 or more quantization states;

the quantization variant used is indicated by a dedicated syntax element, which is transmitted at a block, slice, picture, or sequence level. In an advantageous version, it is transmitted in the picture header.

the quantization state for a transform coefficient is derived by a state transition process, i.e. a surjective mapping, which consists of the following steps:

the state, i.e. the transition state, for a first transform coefficient, i.e. a first residual level, in coding order is set to a pre-defined value; in an advantageous version, it is set equal to 0.

the state for a current transform coefficient, i.e. a current residual level, is derived based on the state for the preceding transform coefficient in coding order and a binary function of the value of the quantization index for the preceding transform coefficient, i.e. a binary function of a value of a preceding residual level. In an advantageous version, the binary function represents the parity, i.e., the current state is given by the preceding state and the parity of the preceding quantization index, i.e. preceding residual level.

the state transition process, i.e. the surjective mapping, which determines the current state 220 based on the preceding state and the binary function (advantageously, the parity) of the preceding quantization index is specified by a state transition table 106.

the state transition table 106 is selected based on the actually selected quantization variant (which is indicated in the bitstream, e.g., by the quantization mode information 180). However, for a given state transition table 106, the state transition process (for example, the binary function used) is independent of the quantizer variant selected.

two scalar quantizer, e.g., the quantizer $151_1$ and the quantizer $151_2$ shown in FIG. 1, are supported, and the quantizer 153 used for a current transform coefficient is uniquely determined by the quantizer state:

the same mapping, i.e. the first mapping 200, from a state 220 to the quantizer id (0 or 1) is used for all supported quantization variants. In an advantageous version, the quantizer id is given by qid=state & 1.

the admissible reconstruction levels 142 of the first quantizer $151_1$ (qid equal to 0) include all even integer multiples of a quantization step size 144.

the admissible reconstruction levels 142 of the second quantizer $151_2$ (qid equal to 1) include all odd integer multiples of a quantization step size 144 and, in addition, the reconstruction level equal to 0.

the quantization indexes, i.e. the residual levels 142, are coded using binary arithmetic coding, see, e.g., FIG. 9, where the binarization 300 includes at least one bin (advantageously, a significance flag 92 indicating whether the quantization index is zero or not) for which the chosen probability model (or context model 242) depends on the quantization state, i.e. the current transition state 220, for the corresponding transform coefficient, i.e. the current residual level. Therefore, the same method for deriving the context model 242 is used for all supported quantization variants. That means, the context model derivation for the corresponding bin depends on the state 220, but it does not depend on the quantization variant that is selected, i.e. is independent of the quantization mode information 180.

In the following, we describe a particular embodiment, which supports independent quantization, dependent quantization with 4 states, and dependent quantization with 8 states.

5.2.1 High-Level Signaling

According to an embodiment, the media signal is a video and the quantization mode information 180 comprises, as shown in FIG. 8, a first syntax element 182, e.g., pps_dep_quant_enabled_idc, in the data stream 14 which indicates for the video or a portion of the video whether the selection of the one default transition table 106 out of the set 159 of default transition tables 106a,b,c is controlled within the video or the portion of the video via a second syntax element 184, e.g., pic_dep_quant_idc, of the quantization mode information 180 in the data stream 14, or which of the set 159 of default transition tables 106a,b,c is to be selected as the one default transition table 106 for the portion of the video.

In other words, the media signal is a video and the quantization mode information 180 comprises a first syntax element 182, e.g., pps_dep_quant_enabled_idc, in the data stream 14 which indicates for the video or a portion of the video whether the update 158 is controlled within the video or the portion of the video via a second syntax element 184, e.g., pic_dep_quant_idc, of the quantization mode information 180 in the data stream 14, or which surjective mapping and which cardinality l,m,n of the set 161 of one or more transition states is to be selected for the update 158.

According to an embodiment, the first syntax element 182 is contained in the data stream 14 within a video parameter set with the portion being the video and the second syntax element 184 controlling the selection of the one default transition table 106 out of the set 159 of default transition tables 106a,b,c in units of a sequence of pictures, pictures, tiles, slices, coding tree blocks, coding blocks, or residual transform blocks. Alternatively, the first syntax element 182 is contained in the data stream 14 within a sequence parameter set with the portion being a sequence of pictures and the second syntax element 184 controlling the selection of the one default transition table 106 out of the set 159 of default transition tables 106a,b,c in units of pictures, tiles, slices, coding tree blocks, coding blocks, or residual transform blocks. Alternatively, the first syntax element 182 is contained in the data stream 14 within a picture parameter set with the portion being one or more pictures and the second syntax element 184 controlling the selection of the one default transition table 106 out of the set 159 of default transition tables 106a,b,c in units of pictures, tiles, slices, coding tree blocks, coding blocks, or residual transform blocks. Alternatively, the first syntax element 182 is contained in the data stream 14 within a picture header with the portion being one picture and the second syntax element 184 controlling the selection of the one default transition table 106 out of the set 159 of default transition tables 106a,b,c in units of tiles, slices, coding tree blocks, coding blocks, or residual transform blocks. Alternatively, the first syntax element 182 is contained in the data stream 14 within a parameter set with the portion being one coding tree block and the second syntax element 184 controlling the selection of the one default transition table 106 out of the set 159 of default transition tables 106a,b,c in units of coding blocks, or residual transform blocks. In case of coding tree blocks, the selection might be controlled in units of which, for instance, one picture is uniformly pre-subdivided before each coding tree block is partitioned into coding blocks by way of recursive multi-tree subdivisoning. In case of coding blocks, the selection might be controlled in units of which, for instance, the intra/inter mode decision is made.

In other words, the first syntax element 182 is contained in the data stream 14 within a video parameter set with the portion being the video and the second syntax element controlling the update 158 in units of a sequence of pictures, pictures, tiles, slices, coding tree blocks, coding blocks, or residual transform blocks. Alternatively, the first syntax element 182 is contained in the data stream 14 within a sequence parameter set with the portion being a sequence of pictures and the second syntax element controlling the update 158 in units of pictures, tiles, slices, coding tree blocks, coding blocks, or residual transform blocks. Alternatively, the first syntax element 182 is contained in the data stream 14 within a picture parameter set with the portion being one or more pictures and the second syntax element controlling the update 158 in units of pictures, tiles, slices, coding tree blocks, coding blocks, or residual transform blocks. Alternatively, the first syntax element 182 is contained in the data stream 14 within a picture header with the portion being one picture and the second syntax element controlling the update 158 in units of tiles, slices, coding tree blocks, coding blocks, or residual transform blocks. Alternatively, the first syntax element 182 is contained in the data stream 14 within a parameter set with the portion being one coding tree block and the second syntax element controlling the update 158 in units of coding blocks, or residual transform blocks. In case of coding tree blocks, the update 158 might be controlled in units of which, for instance, one picture is uniformly pre-subdivided before each coding tree block is partitioned into coding blocks by way of recursive multi-tree subdivisioning. In case of coding blocks, the update might be controlled in units of which, for instance, the intra/inter mode decision is made.

In one version, the quantization method selected is indicated by a syntax element, i.e. the second syntax element 184, coded in the picture header. This syntax element 184 could be called pic_dep_quant_idc and could take one of the following three values, e.g. indicating which surjective mapping and which cardinality l,m,n of the set 161 of one or more transition states is to be selected for the update 158 (e.g., indicating which of the set 159 of default transition tables 106a,b,c is to be selected as the one default transition table 106 for the portion of the video):

value 0 indicates that conventional independent scalar quantization is used for the current picture, e.g., indicating the set 161a with the cardinality l being equal to 1;

value 1 indicates that dependent quantization with 4 states is used for the current picture, e.g., indicating the set 161b with the cardinality m being equal to 4;

value 2 indicates that dependent quantization with 8 states is used for the current picture, e.g., indicating the set 161c with the cardinality n being equal to 8.

In addition, similar as in VTM-7, the presence of the picture header syntax element is indicated by a picture parameter set (PPS) syntax element pps_dep_quant_enabled_idc. This syntax element, i.e. the first syntax element 182, might be coded using a fixed-length code of 2 bits and might have the following semantics:

the value of 0 specifies that the pic_dep_quant_idc is present in the picture header, e.g., indicating that the update 158 is controlled within the video or the portion of the video via the second syntax element 184;

the value of 1 specifies that the pic_dep_quant_idc is not present in the picture header, but is inferred to be equal to 0 (independent scalar quantization) for all pictures that refer to the picture parameter set, e.g., indicating the set 161a with the cardinality l being equal to 1;

the value of 2 specifies that the pic_dep_quant_idc is not present in the picture header, but is inferred to be equal to 1 (dependent quantization with 4 states) for all pictures that refer to the picture parameter set, e.g., indicating the set 161b with the cardinality m being equal to 4;

the value of 3 specifies that the pic_dep_quant_idc is not present in the picture header, but is inferred to be equal to 2 (dependent quantization with 8 states) for all pictures that refer to the picture parameter set, e.g., indicating the set 161c with the cardinality n being equal to 8.

Similar as in VTM-7, the pps_dep_quant_enabled_idc 182 in the picture parameter set is present of a picture parameter set flag constant_slice_header_params_enabled_flag is equal to 1. If the picture parameter set flag constant_slice_header_params_enabled_flag is equal to 0, the picture parameter set syntax element pps_dep_quant_enabled_idc 182 is not present in the picture parameter set, but it is inferred to be equal to 0 (in which case, the pic_dep_quant_idc 184 is coded in the picture header).

5.2.2 State Transition Tables

The state transition table 106 might be selected based on the value (transmitted or inferred value) of the picture header syntax element pic_dep_quant_idc (or any similar syntax element). As shown in FIG. 10, three state transition tables 106a,b,c might be supported for 3 supported quantization variants. The state transition tables 106a,b,c represent examples (the actually used state transition tables may deviate from these examples).

According to an embodiment, only the state transition tables 106a and 106b are used by a decoder 20 and/or a corresponding encoder.

5.2.3 State Transition

For each transform block 112, the initial state is set equal to 0.

The transform coefficients, i.e. the residual levels 142, of a transform block 112 are processed in a pre-defined coding order 102. Given the state for a current transform coefficient (currState), i.e. the current transition state 220, and the quantization index (also called transform coefficient level or residual level) for a current transform coefficient (currLevel), the state for the next transform coefficient (nextState) in coding/processing order is derived according to nextState=stateTransTab[currState][currLevel & 1], e.g., representing a surjective mapping, where stateTransTab specifies the state transition table 106 that is determined by the quantization variant selected. Here, the parity of the quantization index (currLevel & 1) determines the path variable (see state transition tables above). Instead of using the parity, it is also possible that any other binary function of the quantization index is used (see above).

5.2.4 Reconstruction of Transform Coefficients

The quantizer 153 used for a current transform coefficient, i.e. a current residual level, is uniquely specified by the value of the state variable, i.e. the current transition state 220. The quantizer id QId is derived according to QId=state & 1, representing a first mapping 200, where & represent the bit-wise "and" operator. The quantizer $151_1$ with QId=0 comprises the even integer multiples of a quantization step size 144 as admissible reconstruction levels 142. The quantizer $151_2$ with QId=1 comprises the odd integer multiples of a quantization step size 144 and the value equal to 0 as admissible reconstruction levels 142.

An example for the reconstruction process of transform coefficients of a single transform block is shown in FIG. 11 using C-style pseudo-code.

FIG. 11 shows a Pseudo-code illustrating the reconstruction process of transform coefficients for a transform block 112. The array level represents the transmitted transform coefficient levels, i.e. transmitted residual levels 142 (quantization indexes), for the transform block 112 and the array trec represent the corresponding reconstructed transform coefficients 104. The 2d table state_trans_table specifies the state transition table 106, e.g., selected based on a high-level syntax element (e.g., dep_quant_idc).

In the pseudo-code of FIG. 11, the index k specifies the reconstruction order 102 of transform coefficients, i.e. residual levels 142. It should be noted that, in the example code, the index k decreases in reconstruction order. The last transform coefficient has the index equal to k=0. The first index kstart specifies the reconstruction index (or, more accurately, the inverse reconstruction index) of the first reconstructed transform coefficient. The variable kstart may be set equal to the number of transform coefficients in the transform block minus 1, or it may be set equal to the index of the first non-zero quantization index (for example, if the location of the first non-zero quantization index is transmitted in the applied entropy coding method) in coding/reconstruction order 102. In the latter case, all preceding transform coefficients (with indexes k>kstart) are inferred to be equal to 0. The quantization indexes, i.e. the residual levels 142, are represent by level[k] and the associated reconstructed transform coefficients, i.e. the dequantized residual levels 104, are represented by trec[k]. The state variable, i.e. the current transition state 220, is represented by state. The state transition table 106 is specified by the 2d array state_trans_table[ ][ ]. Instead of using a table state_trans_table[ ][ ] for determining the next state, an arithmetic operation yielding the same result can be used.

quant_step_size[k] specifies the quantization step size 144 for a transform coefficient at index k. Note that different quantization step sizes 144 can be used for different transform coefficient locations k (as given by a quantization weighting matrix in combination with a block quantization parameter). As mentioned above, the multiplication with a non-integer quantization step size is often implemented using integer operations, for example, $$trec[k]=(n*scale[k]+add)>>shift$$

where the quantization step size 144 is basically given by $\Delta_k=scale[k] \cdot 2^{-shift}$.

5.2.5 Entropy Coding of the Quantization Index (or Transform Coefficient Levels)

In an advantageous version, see FIG. 9, the quantization indexes are coded using binary arithmetic coding similar to H.264|MPEG-4 AVC or H.265|MPEG-H HEVC.

For that purpose, the non-binary quantization indexes 90 are first mapped onto a series of binary decisions (which are commonly referred to as bins). The quantization indexes are transmitted as absolute value and, for absolute values greater than 0, a sign. In an advantageous version, the same binarization as in VTM-7 is used.

| |q| | sig_flag | gt1_flag | par_flag | gt3_flag | rem |
|---|---|---|---|---|---|
| 0 | 0 | — | — | — | — |
| 1 | 1 | 0 | — | — | — |
| 2 | 1 | 1 | 0 | 0 | — |
| 3 | 1 | 1 | 1 | 0 | — |
| 4 | 1 | 1 | 0 | 1 | 0 |
| 5 | 1 | 1 | 1 | 1 | 0 |
| 6 | 1 | 1 | 0 | 1 | 1 |
| 7 | 1 | 1 | 1 | 1 | 1 |
| 8 | 1 | 1 | 0 | 1 | 2 |
| 9 | 1 | 1 | 1 | 1 | 2 |
| 10 | 1 | 1 | 0 | 1 | 3 |
| 11 | 1 | 1 | 1 | 1 | 3 |
| 12 | 1 | 1 | 0 | 1 | 4 |
| 13 | 1 | 1 | 1 | 1 | 4 |
| 14 | 1 | 1 | 0 | 1 | 5 |
| 15 | 1 | 1 | 1 | 1 | 5 |
| ... | ... | ... | ... | ... | ... |

The following binary and non-binary syntax elements are transmitted:

- sig_flag 92 specifies whether the absolute value |q| of the transform coefficient level is greater than 0;
- if sig_flag 92 is equal to 1, gt1_flag 96 specifies whether the absolute value |q| of the transform coefficient level is greater than 1;
- if gt1_flag 96 is equal to 1, par_flag 94 specifies the parity of the absolute value |q| of the transform coefficient level, and gt3_flag 98 specifies whether the absolute value |q| of the transform coefficient level is greater than 3;
- if gt3_flag 98 is equal to 1, the non-binary value rem 99 specifies the remainder of the absolute level |q|. This syntax element is transmitted in bypass mode of the arithmetic coding engine, using a Golomb-Rice code.

Not present syntax elements are inferred to be equal to 0. At the decoder side the absolute value of the transform coefficient levels is reconstructed as follows:

$$|q|=sig\_flag+gt1\_flag+par\_flag+2*(gt3\_flag+rem)$$

For non-zero transform coefficient levels (indicated by sig_flag 92 equal to 1), a sign_flag specifying the sign of the transform coefficient level is additionally transmitted in bypass mode.

The coding order 102 of bins and the context modelling are basically the same as in VTM-7, except for the following two aspects described below. In addition, the same concept for restricting the worst case number of context-coded bins is used.

FIG. 9 illustrates the initial value domain for the absolute value of the residual level 142 at 90. This initial value domain 90 may encompass all integer values between zero and some maximum value. The initial value domain 90 may also be an interval which open towards larger numbers.

The number of integer values in the initial value domain 90 need not to be necessarily a power of 2. Further, FIG. 9 shows the various bin types participating in representing the individual residual levels 142, i.e., participating in indicating the absolute value thereof. There is the sig_flag 92 type indicating whether the absolute value of a certain residual level is zero or not. That is, the sig_flag 92 bi-splits the initial value domain 90 into two sub-portions, namely, one merely comprising the zero, and the other comprising all other possible values. That is, the sig_flag 92 already uniquely indicates the absolute value of a residual level if the latter happens to be zero as illustrated at the bottom of FIG. 9. The non-zero values of the initial value domain 90 form a value domain 96 which is further bi-split by the bin type gt1_flag 96, namely one merely comprising the one, and the other comprising all other possible values. The next flag, namely a par_flag 94 splits the resulting value domain comprising all values greater than one into odd values on the one hand and even values on the other hand. The par_flag 94 needs to be present for a certain residual level 142 only if the latter is greater than one. The par_flag 94 does not yield uniqueness with respect to one of the halves into which same bi-splits the value domain 94. It indicates one half as the next resulting (recursively defined) value domain and accordingly, the next flag, namely the gt3_flag 98, bi-splits this resulting value domain after the par_flag 94 further. As shown at the bottom of FIG. 9, this means that merely the sig_flag 92 is coded for a residual level of a certain transform coefficient if the latter happens to be zero, and sig_flag 92 and gt1_flag 96 are coded for a residual level of a certain transform coefficient if the latter happens to be one. All flags sig_flag 92, gt1_flag 96, par_flag 94 and gt3_flag 98 are coded so as to represent a certain residual level of a certain transform coefficient if the latter happens to fall into a value interval comprising absolute values 2 to 5., and additionally a reminder 99 is coded for residual levels of transform coefficients the absolute value of which lies in a remaining interval out of the initial value domain 90.

5.2.5.1 Context Selection for the Significance Flag

FIG. 9 shows an embodiment for context-adaptive binary arithmetic coding (CABAC) of a significance bin 92. According to an embodiment, the decoder 20, shown in FIG. 8, is configured to decode 210 the current residual level from the data stream 14 using context-adaptive binary arithmetic decoding 240 of bins of a binarization 300 of the current residual level, the bins comprising a significance bin 92 indicative whether the current residual level is zero or non-zero. The decoder 20 might be configured to select a first context 242 for decoding the first bin, i.e. the significance bin 92, of the current residual level depending on a value 230 obtained by mapping, using a second mapping 202, a further predetermined number of bits, e.g., LSBs, of the current transition state 220 onto said value 230. The second mapping 202 might be equal whatever the quantization mode information 180 is, e.g. might be equal whatever the default transition table 106a,b,c is selected as the transition table 106 to be used. The further predetermined number of bits indicates, for example, one or more bits of the current transition state 220 at one or more predetermined bit positions such as the LSB or the bit at the second but last significant bit position.

According to an embodiment, the further predetermined number of bits is two and, e.g., indicates the LSB (last significant bit) and the bit at the second but last significant bit position. The value 230 might result out of the second mapping 202 being max(state-1, 0), as indicated in section 5.1, or being max(0, (state&3)-1). Alternative mappings are possible.

For the significance flag, i.e. the significance bin 92, the selected probability model, i.e. a context model or context 242, depends, for example, on the following:
whether the current transform block 112 is a luma or chroma transform block;
the transition state for dependent quantization;
the x and y coordinate of the current transform coefficient (the current residual level represents the residual level of the current transform coefficient);
the partially reconstructed absolute residual values (after the first pass $60_1$) in a local neighborhood.

The variable state represents the state, i.e. the current transition state 220, for a current transform coefficient. As explained above, the state 220 for a current transform coefficient is given by the state for the previous coefficient in coding order 102 and the parity (or, more general, a binary function) of the previous transform coefficient level.

With x and y being the coordinates of a current transform coefficient inside the transform block 112, let diag=x+y be a diagonal position of the current coefficient. Given the diagonal position, a diagonal class index dsig is derived as follows:
dsig=(diag<2?2:(diag<5?1:0)) for luma transform blocks and
dsig=(diag<2?1:0) for chroma transform blocks The ternary operator (c?a:b) represents an if-then-else statement. If the conditions c is true, the value of a is used, otherwise (c is false), the value b is used.

Figure 7:
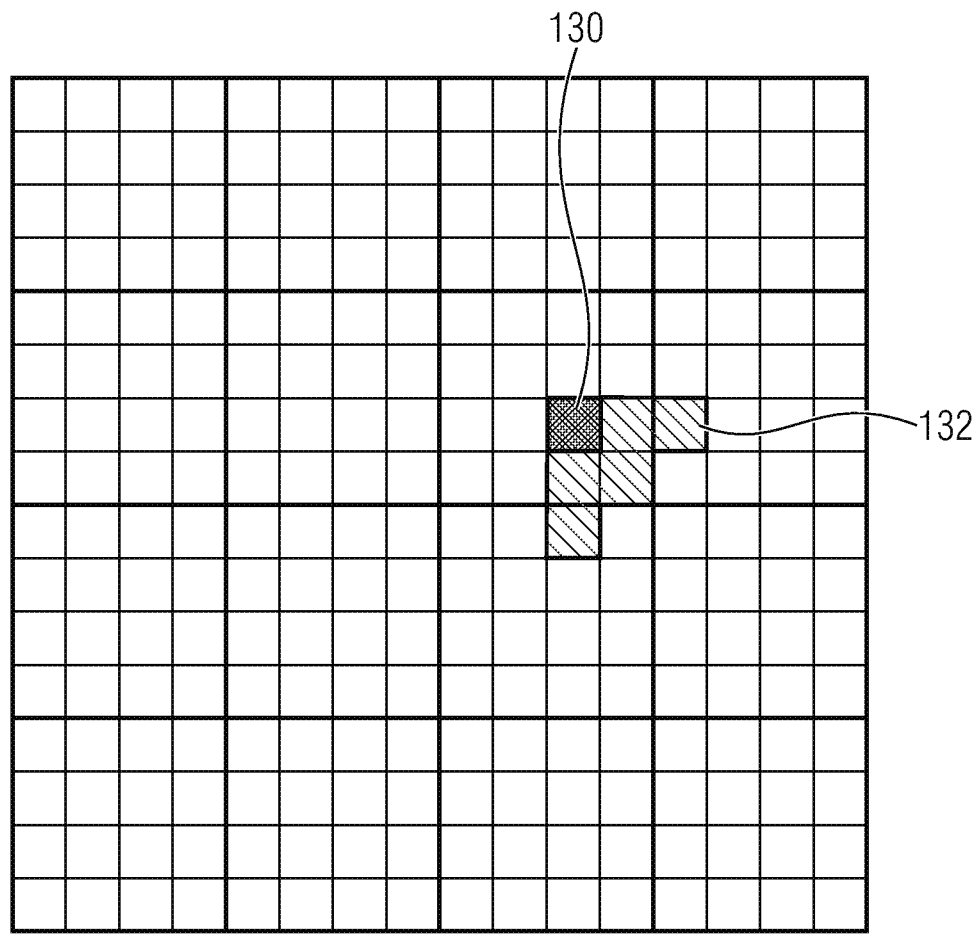
FIG. 7 shows a local template useable for selecting probability models for one or more bins.

The context 242 might depend on the partially reconstructed absolute values inside a local neighborhood. As in VTM-7, the local neighborhood might be given by a template T 132, e.g., as shown in FIG. 7. But other templates 132 are possible. The template 132 used could also depend on whether a luma or a chroma block is coded. Let sumAbs be the sum of partially reconstructed absolute values (after the first pass $60_1$) in the template T 132:

$$sumAbs = \sum_{k \in T} abs1[k],$$

where abs1[k] represents the partially reconstructed absolute level for a scan index k after the first pass. With the binarization of VTM-7, it is given by abs1[k]=sig_flag[k]+gt1_flag[k]+par_flag[k]+2*gt3_flag[k].

Note that abs1[k] is equal to the value coeff[k] obtained after the first scan pass $60_1$ (see above).

Let us assume that the possible probability models, i.e. the context 242, for the sig_flag 92 are organized in a 1d array. And let ctxIdSig be an index that identifies the probability model 242 used. The context index ctxIdSig, e.g., an index indicating the context 242, could be derived 110 as follows:
If the transform block is a luma block, ctxIdSig=min((sumAbs+1)>>1,3)+4*dsig+
12*state2CtxSet(state & 3)

If the transform block is a chroma block, ctxIdSig=36+min((sumAbs+1)>>1,3)+4*dsig+
8*state2CtxSet(state & 3)

Here, the operator ">>" represents a bit shift to the right (in two-complement arithmetic). The operation is identical to a division by two and a downrounding (to the next integer) of the result.

Note that the state, i.e. the current transition state 220, is first mapped to a value between 0 and 3, inclusive. This might be achieved by applying a bit-wise "and" with 3 (i.e., state & 3). Then the function state2CtxSet( . . . ) maps this value to one of the values 230 0, 1, 2. In an embodiment, the function is given by $$state2CtxSet(x) = \begin{cases} 0 & \text{for } x = 0 \text{ and } x = 2 \\ 1 & \text{for } x = 1 \\ 2 & \text{for } x = 3 \end{cases}$$

According to this embodiment, the second mapping 202 can be understood as two consecutive mappings, wherein the current transition state 220 is first mapped to a first value and then this first value is mapped onto the value 230 on which the selection of the context 242 depends.

Note that the context index depends on the state 220, but it does not depend on the quantization method 180 used.

Note that other organizations of the context models, i.e. different contexts 242, are possible. But in any case, the probability model, i.e. the context 242, chosen for coding a sig_flag 92 depends on
whether a luma or a chroma block is coded;
the state variable 220 (but the same function, e.g., is used for all supported quantization variants);
the diagonal class dsig;
the sum of partially reconstructed absolute values (after the first pass $60_1$) inside the local template 132, specifically min((sumAbs+1)>>1, 3).

5.2.5.2 Mapping Parameter for Bypass-Coded Transform Coefficient Levels

According to an embodiment, the media signal is a video and the decoder 20, shown in FIG. 8, is configured to decode 210 the residual levels 142 from the data stream 14 by decoding residual levels relating to one picture block 84, e.g., representing transform coefficient block 112, prior to residual levels relating to another picture block 84, as illustrated on the bottom right of FIG. 6. The decoder 20 might be configured to sequentially decode 210 bins of the binarization 300 of the residual levels 142 relating to the one picture block 84 in one or more scans 60, i.e. a scan along the coding order 102, and using context-adaptive binary arithmetic decoding for a predetermined number of leading bins of the bins of the binarization 300 of the residual levels 142 and using an equi-probability bypass mode for subsequent bins of the binarization 300 of the residual levels 142. As shown in FIG. 9, for example, the significance bin 92, a parity bin 94, a greater-than-one bin 96 and a greater-than-three bin 98 are decoded in a first scan $60_1$, i.e. a first pass, and remainder bins 99 are coded in a second scan $60_2$. Alternatively, the residual levels 142 might be decoded in one scan 60 or in three or more scans 60. FIG. 9 shows an exemplary transform coefficient block 112, wherein the transform coefficients are scanned along the coding order 102 starting at a first non-zero residual level 120. The bins of the binarization of the residual levels 146 up to the residual level 304 are decoded using CABAC and the bins of the binarization of the residual levels 144 are coded using the equi-probability bypass mode, since the residual level 304 represents a last residual level for which the predetermined number of leading bins is not exceeded. The decoder 20 might be configured to determine the binarization 300 of a predetermined residual level 145 for which the predetermined number 304 of bins is exhausted, by mapping, using a third mapping 118, a further predetermined number of bits, e.g., of LSBs, of a transition state 220, i.e. of the transition state associated with the predetermined residual level 145, onto a binarization parameter 302 and performing the determination of the binarization 300 of the predetermined residual level 145 depending on the binarization parameter 302. According to an embodiment, the determination of the binarization might be performed by the decoder 20 for all residual levels 144, for which the predetermined number 304 of bins is exhausted. The bits of the transition state 220, e.g., are one or more bits at one or more predetermined bit positions such as the LSB or the bit at the second but last significant bit position of the transition state 220.

According to an embodiment, the decoder 20 is configured to determine the binarization 300 for the predetermined residual level 145 depending on the binarization parameter 302 so that the binarization 300 is a default binarization, e.g., a Golomb-Rice code, modified by re-directing one binarization code which depends on the binarization parameter 302, e.g., pos0, from being associated with a predetermined level to being associated with level zero and re-directing one or more binarization codes from being associated with one or more levels from zero to the predetermined level minus one, to be associated with one or more levels from one to the predetermined level. The modification of the default binarization might be realized by equation $|q|=$ (abs_level==pos0?0:(abs_level<pos0?abs_level+1: abs_level), see below.

According to an embodiment, the further predetermined number of bits is one.

Similar as in VTM-7, the absolute levels, i.e. the residual levels 144, for which no data is coded in the first scan pass $60_1$ are completely coded in bypass mode, i.e. in equi-probability bypass mode. They are coded using the same class of codes as for the remainder rem 99. The Rice parameter as well as a variable pos0, i.e. the binarization parameter 302, might be determined based on already coded syntax elements (see below). These absolutes levels |q| 144, for example, are not directly coded, but they are first mapped to syntax elements abs_level, which are then coded using the parametric codes.

The mapping of an absolute value |q| 144 to the syntax element abs_level might depend on a variable pos0 302. It is specified by abs_level=(|q|==0?pos0:(|q|<=pos0?|q|−1:|q|)

At the decoder side, the mapping of the syntax element abs_level to the absolute value |q| might be specified as follows

|q|=(abs_level==pos0?0:(abs_level<pos0?abs_level+1:abs_level)

The Rice parameter RPabs used for coding abs_level is derived according to

RPabs=tabRPabs[min(sumAbs,31)], where sumAbs represent the sum of absolute quantization indexes, i.e. the sum of absolute levels of residual levels, inside a local template 132 (see above).

The variable pos0 302 might depend on both, the sum of reconstructed absolute values in the local template 132 and the state variable 220. The variable pos0 302 is derived 118 from the quantization state 220 and the Rice parameter RPabs according to pos0=(1+(state & 1))<<RPabs.

Note that the variable pos0 302 does depend on the state 220, but not on the quantization method 180 used.

The equation pos0=(1+(state & 1))<<RPabs might represent the third mapping 118 of the further predetermined number of bits of the transition state 220 onto the binarization parameter pos0 302, wherein (state & 1) indicates that the LSB is mapped onto the binarization parameter pos0. The further predetermined number of bits is one.

Alternatively, the equation pos0=(state<2?1:2)<< RPabs might represent the third mapping 118 of the further predetermined number of bits of the transition state 220 onto the binarization parameter pos0 302, wherein (state<2?1:2) indicates that the second but last significant bit position of the transition state 220 is mapped onto the binarization parameter pos0, see the last item in section 5.1. The further predetermined number of bits is one.

5.3 Aspects of Other Embodiments

Several aspects of the embodiment described above can be modified. In the following, some of these aspects are pointed out:

- the number of quantization variants support and/or the actual state transition tables 106 for these variants can be modified;
- a different mechanism for indicating the quantization variant chosen can be used;
- a different binary function of the quantization indexes could be used for the state transition process. That means the state transition could be specified by nextState=stateTransTable[currState][binFun(currLevel)], where binFunc( ) specifies any binary function (i.e., a function with possible function values of 0 and 1).
- a different binarization process could be used for coding the quantization indexes. In particular, it is possible to use a state dependent binarization, where multiple binarizations are supported and the binarization used is dependent on the quantization state (and possibly other parameters). In this case, the selection of the binarization would be dependent on the value of the state variable, but independent of the chosen quantization method. As an example, two binarization might be supported and the binarization selected could depend on the value of (state & 1).
- a different context modeling could be used for any of the bins. In this case, the context for one or more bins could still depend on the state variable, but it would be independent of the quantization method selected.

a different approach for determining the Rice parameters for the remainder and/or the bypass-coded quantization indexes could be used.

a different approach for deriving the parameter pos0 for coding the bypass-coded quantization indexes could be used. But in combination with the invention, it parameter pos0 is determined independent of the quantization method selected.

5.4 Even Further Embodiments

In the embodiments described above, transform coding is used to code a prediction residual and a quantization scheme/mode is chosen by the encoder and signaled to the decoder so as to be used to quantize/dequantize the transform coefficients. Entropy coding of the obtained quantization indexes, namely context-adaptive arithmetic coding, maybe used. At the decoder side, the set of reconstructed samples is obtained by corresponding decoding of the quantization indexes and a corresponding dequantization of transform coefficients, so that an inverse transform yields the prediction residual in spatial domain. However, the embodiments set out above may be modified to yield other embodiments such as in terms of coding other residual values such as residual samples in spatial domain. Instead of using above embodiments for coding a video, another media signal may be treated using above concepts such as an audio signal. The description of embodiments below is mainly targeted on a lossy coding of blocks of prediction error samples in image and video codecs, but the embodiments can also be applied to other areas of lossy coding. In particular, no restriction to sets of samples that form rectangular blocks exists.

Although not being restricted to video coding using transform based prediction residual coding, subsequently a description of video encoder and video decoder of a block-based predictive codec for coding pictures of a video is provided in order to form an example for a coding framework into which embodiments for coding and decoding a transformed representation of a sample block may be built in. The video encoder and video decoder are described with respect to FIGS. 12 to 14. The description of embodiments of the present application as they are provided above, may be readily built into the video encoder and decoder of FIGS. 12 and 13, respectively, although the embodiments described above, may also be used to form video encoder and video decoders not operating according to the coding framework underlying the video encoder and video decoder of FIGS. 12 and 13.

Figure 12:
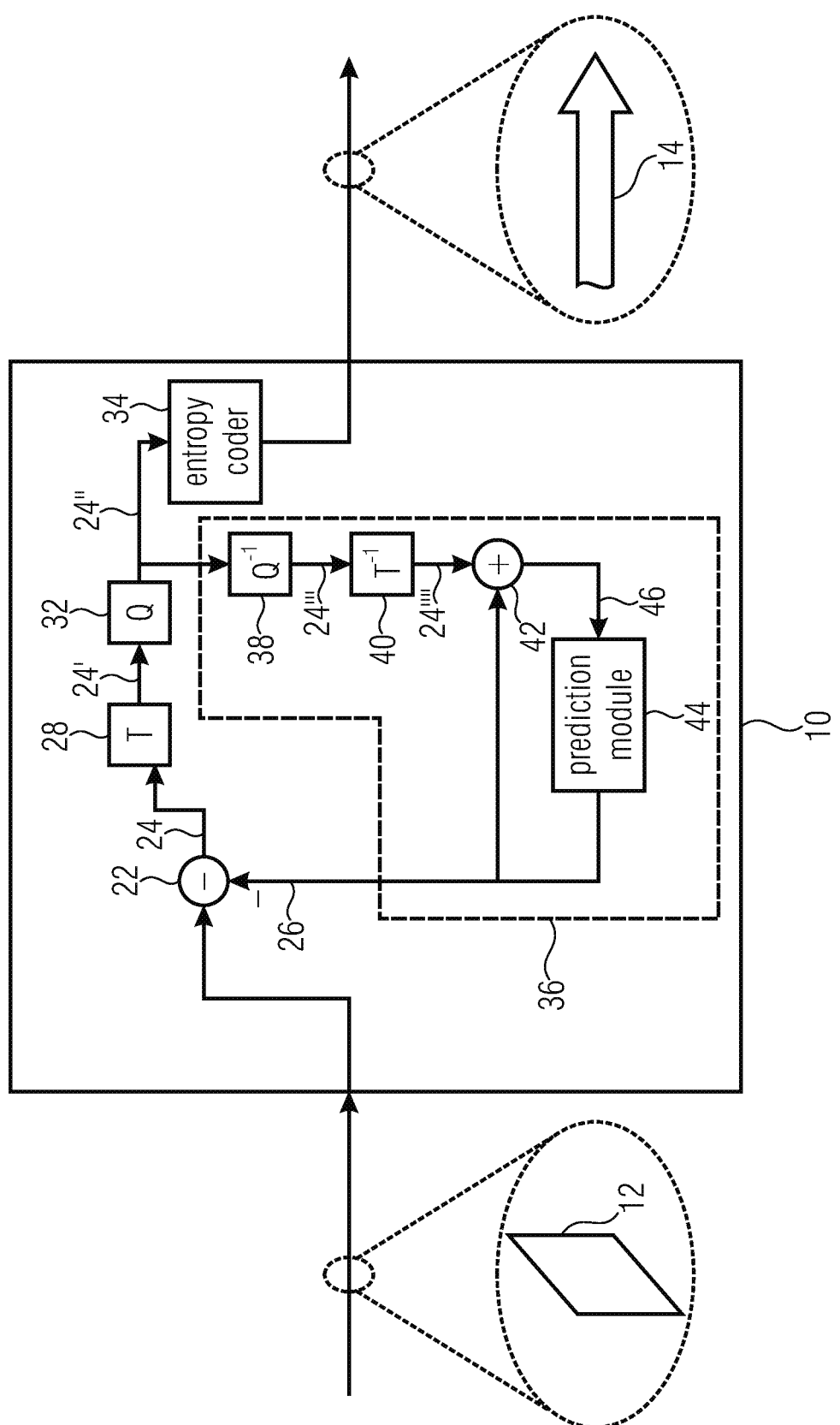
FIG. 12 shows a picture and/or video encoder.
Figure 13:
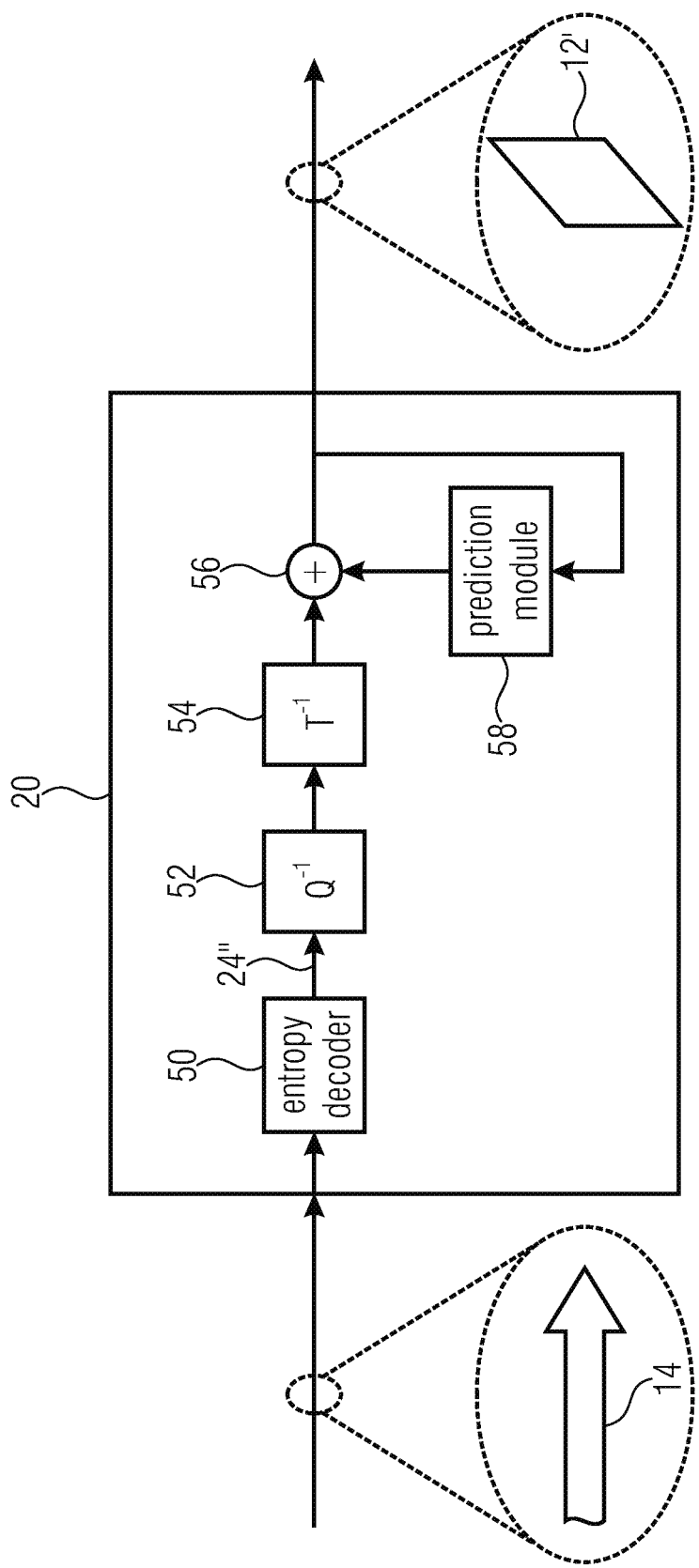
FIG. 13 shows a picture and/or video decoder.

FIG. 12 shows an apparatus for predictively coding a video 11 composed of a sequence of pictures 12 into a data stream 14. Block-wise predictive coding is used to this end. Further, transform-based residual coding is exemplarily used. The apparatus, or encoder, is indicated using reference sign 10. FIG. 13 shows a corresponding decoder 20, i.e. an apparatus 20 configured to predictively decode the video 11' composed of pictures 12' in picture blocks from the data stream 14, also here exemplarily using transform-based residual decoding, wherein the apostrophe has been used to indicate that the pictures 12' and video 11', respectively, as reconstructed by decoder 20 deviate from pictures 12 originally encoded by apparatus 10 in terms of coding loss introduced by a quantization of the prediction residual signal. FIG. 12 and FIG. 13 exemplarily use transform based prediction residual coding, although embodiments of the present application are not restricted to this kind of prediction residual coding. This is true for other details described with respect to FIGS. 12 and 13, too, as will be outlined hereinafter.

The encoder 10 is configured to subject the prediction residual signal to spatial-to-spectral transformation and to encode the prediction residual signal, thus obtained, into the data stream 14. Likewise, the decoder 20 is configured to decode the prediction residual signal from the data stream 14 and subject the prediction residual signal thus obtained to spectral-to-spatial transformation.

Internally, the encoder 10 may comprise a prediction residual signal former 22 which generates a prediction residual 24 so as to measure a deviation of a prediction signal 26 from the original signal, i.e. video 11 or a current picture 12. The prediction residual signal former 22 may, for instance, be a subtractor which subtracts the prediction signal from the original signal, i.e. current picture 12. The encoder 10 then further comprises a transformer 28 which subjects the prediction residual signal 24 to a spatial-to-spectral transformation to obtain a spectral-domain prediction residual signal 24' which is then subject to quantization by a quantizer 32, also comprised by encoder 10. The thus quantized prediction residual signal 24" is coded into bitstream 14. To this end, encoder 10 may optionally comprise an entropy coder 34 which entropy codes the prediction residual signal as transformed and quantized into data stream 14. The prediction residual 26 is generated by a prediction stage 36 of encoder 10 on the basis of the prediction residual signal 24" decoded into, and decodable from, data stream 14. To this end, the prediction stage 36 may internally, as is shown in FIG. 12, comprise a dequantizer 38 which dequantizes prediction residual signal 24" so as to gain spectral-domain prediction residual signal 24''', which corresponds to signal 24' except for quantization loss, followed by an inverse transformer 40 which subjects the latter prediction residual signal 24''' to an inverse transformation, i.e. a spectral-to-spatial transformation, to obtain prediction residual signal 24'''', which corresponds to the original prediction residual signal 24 except for quantization loss. A combiner 42 of the prediction stage 36 then recombines, such as by addition, the prediction signal 26 and the prediction residual signal 24'''' so as to obtain a reconstructed signal 46, i.e. a reconstruction of the original signal 12. Reconstructed signal 46 may correspond to signal 12'.

A prediction module 44 of prediction stage 36 then generates the prediction signal 26 on the basis of signal 46 by using, for instance, spatial prediction, i.e. intra-prediction, and/or temporal prediction, i.e. inter-prediction. Details in this regard are described in the following.

Likewise, decoder 20 may be internally composed of components corresponding to, and interconnected in a manner corresponding to, prediction stage 36. In particular, entropy decoder 50 of decoder 20 may entropy decode the quantized spectral-domain prediction residual signal 24" from the data stream, whereupon dequantizer 52, inverse transformer 54, combiner 56 and prediction module 58, interconnected and cooperating in the manner described above with respect to the modules of prediction stage 36, recover the reconstructed signal on the basis of prediction residual signal 24" so that, as shown in FIG. 13, the output of combiner 56 results in the reconstructed signal, namely the video 11' or a current picture 12' thereof.

Although not specifically described above, it is readily clear that the encoder 10 may set some coding parameters including, for instance, prediction modes, motion parameters and the like, according to some optimization scheme such as, for instance, in a manner optimizing some rate and distortion related criterion, i.e. coding cost, and/or using some rate control. As described in more details below, encoder 10 and decoder 20 and the corresponding modules 44, 58, respectively, support different prediction modes such as intra-coding modes and inter-coding modes which form a kind of set or pool of primitive prediction modes based on which the predictions of picture blocks are composed in a manner described in more detail below. The granularity at which encoder and decoder switch between these prediction compositions may correspond to a subdivision of the pictures 12 and 12', respectively, into blocks. Note that some of these blocks may be blocks being solely intra-coded and some blocks may be blocks solely being inter-coded and, optionally, even further blocks may be blocks obtained using both intra-coding and inter-coding, but details are set-out hereinafter. According to intra-coding mode, a prediction signal for a block is obtained on the basis of a spatial, already coded/decoded neighborhood of the respective block. Several intra-coding sub-modes may exist the selection among which, quasi, represents a kind of intra-prediction parameter. There may be directional or angular intra-coding sub-modes according to which the prediction signal for the respective block is filled by extrapolating the sample values of the neighborhood along a certain direction which is specific for the respective directional intra-coding sub-mode, into the respective block. The intra-coding sub-modes may, for instance, also comprise one or more further sub-modes such as a DC coding mode, according to which the prediction signal for the respective block assigns a DC value to all samples within the respective block, and/or a planar intra-coding mode according to which the prediction signal of the respective block is approximated or determined to be a spatial distribution of sample values described by a two-dimensional linear function over the sample positions of the respective block with deriving tilt and offset of the plane defined by the two-dimensional linear function on the basis of the neighboring samples. Compared thereto, according to inter-prediction mode, a prediction signal for a block may be obtained, for instance, by temporally predicting the block inner. For parametrization of an inter-prediction mode, motion vectors may be signaled within the data stream, the motion vectors indicating the spatial displacement of the portion of a previously coded picture of the video 11 at which the previously coded/decoded picture is sampled in order to obtain the prediction signal for the respective block. This means, in addition to the residual signal coding comprised by data stream 14, such as the entropy-coded transform coefficient levels representing the quantized spectral-domain prediction residual signal 24'', data stream 14 may have encoded thereinto prediction related parameters for assigning to the blocks prediction modes, prediction parameters for the assigned prediction modes, such as motion parameters for inter-prediction modes, and, optionally, further parameters which control a composition of the final prediction signal for the blocks using the assigned prediction modes and prediction parameters as will be outlined in more detail below. Additionally, the data stream may comprise parameters controlling and signaling the subdivision of picture 12 and 12', respectively, into the blocks. The decoder 20 uses these parameters to subdivide the picture in the same manner as the encoder did, to assign the same prediction modes and parameters to the blocks, and to perform the same prediction to result in the same prediction signal.

Figure 14:
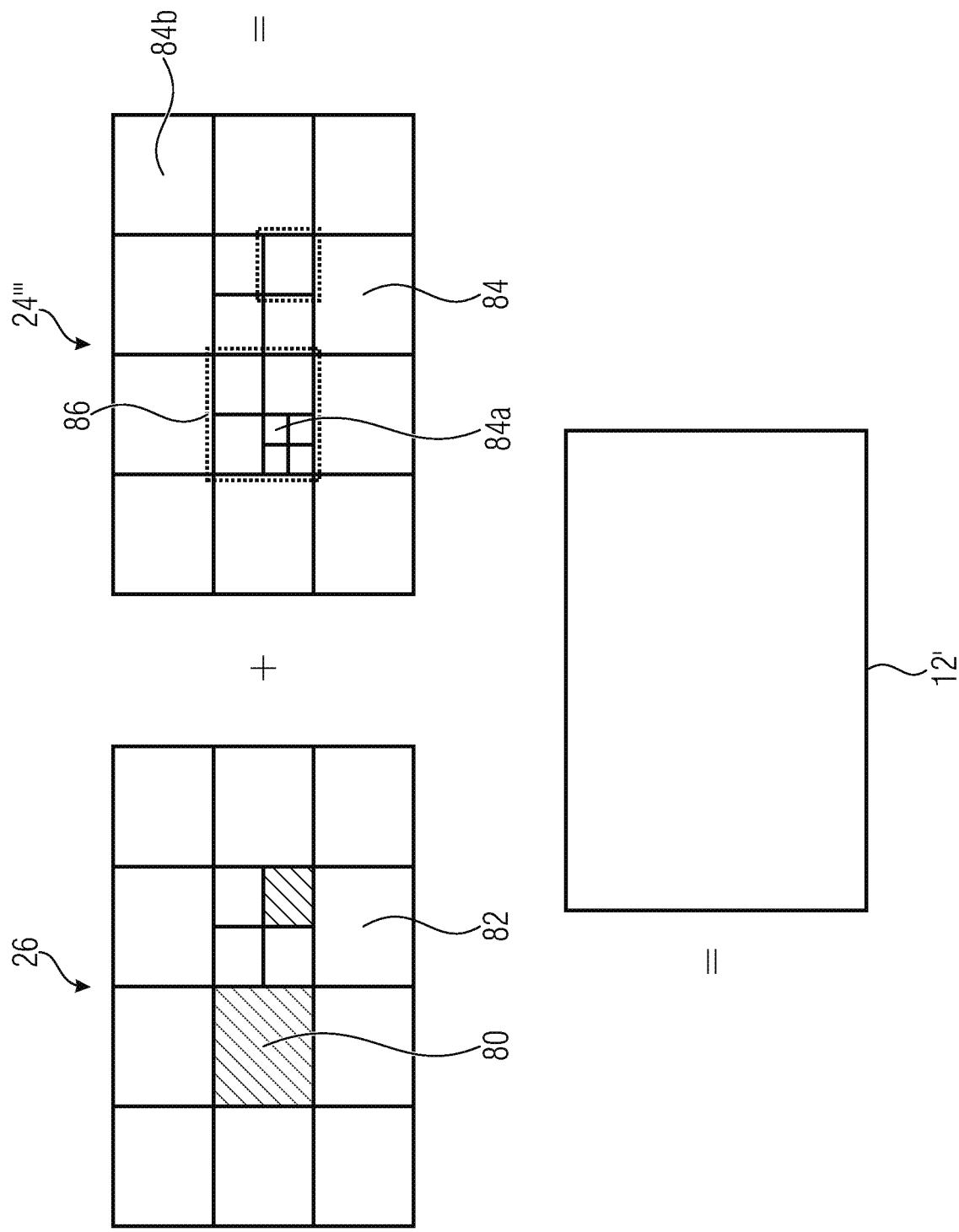
FIG. 14 shows a relationship between a reconstructed signal and a combination of a prediction residual signal and a prediction signal.

FIG. 14 illustrates the relationship between the reconstructed signal, i.e. the reconstructed picture 12', on the one hand, and the combination of the prediction residual signal 24'''' as signaled in the data stream, and the prediction signal 26, on the other hand. As already denoted above, the combination may be an addition. The prediction signal 26 is illustrated in FIG. 14 as a subdivision of the picture area into blocks 80 of varying size, although this is merely an example. The subdivision may be any subdivision, such as a regular subdivision of the picture area into rows and columns of blocks, or a multi-tree subdivision of picture 12 into leaf blocks of varying size, such as a quadtree subdivision or the like, wherein a mixture thereof is illustrated in FIG. 14 where the picture area is firstly subdivided into rows and columns of tree-root blocks which are then further subdivided in accordance with a recursive multi-tree subdivisioning to result into blocks 80.

The prediction residual signal 24'''' in FIG. 14 is also illustrated as a subdivision of the picture area into blocks 84. These blocks might be called transform blocks in order to distinguish same from the coding blocks 80. In effect, FIG. 14 illustrates that encoder 10 and decoder 20 may use two different subdivisions of picture 12 and picture 12', respectively, into blocks, namely one subdivisioning into coding blocks 80 and another subdivision into blocks 84. Both subdivisions might be the same, i.e. each block 80, may concurrently form a transform block 84 and vice versa, but FIG. 14 illustrates the case where, for instance, a subdivision into transform blocks 84 forms an extension of the subdivision into blocks 80 so that any border between two blocks 80 overlays a border between two blocks 84, or alternatively speaking each block 80 either coincides with one of the transform blocks 84 or coincides with a cluster of transform blocks 84. However, the subdivisions may also be determined or selected independent from each other so that transform blocks 84 could alternatively cross block borders between blocks 80. As far as the subdivision into transform blocks 84 is concerned, similar statements are thus true as those brought forward with respect to the subdivision into blocks 80, i.e. the blocks 84 may be the result of a regular subdivision of picture area into blocks, arranged in rows and columns, the result of a recursive multi-tree subdivisioning of the picture area, or a combination thereof or any other sort of segmentation. Just as an aside, it is noted that blocks 80 and 84 are not restricted to being quadratic, rectangular or any other shape. Further, the subdivision of a current picture 12 into blocks 80 at which the prediction signal is formed, and the subdivision of a current picture 12 into blocks 84 at which the prediction residual is coded, may not the only subdivision used for coding/decoding. These subdivisions form a granularity at which prediction signal determination and residual coding is performed, but firstly, the residual coding may alternatively be done without subdivisioning, and secondly, at other granularities than these subdivisions, encoder and decoder may set certain coding parameters which might include some of the aforementioned parameters such as prediction parameters, prediction signal composition control signals and the like.

FIG. 14 illustrates that the combination of the prediction signal 26 and the prediction residual signal 24'''' directly results in the reconstructed signal 12'. However, it should be noted that more than one prediction signal 26 may be combined with the prediction residual signal 24'''' to result into picture 12' in accordance with alternative embodiments such as prediction signals obtained from other views or from other coding layers which are coded/decoded in a separate prediction loop with separate DPB, for instance.

In FIG. 14, the transform blocks 84 shall have the following significance. Transformer 28 and inverse transformer 54 perform their transformations in units of these transform blocks 84. For instance, many codecs use some sort of DST or DCT for all transform blocks 84. Some codecs allow for skipping the transformation so that, for some of the transform blocks 84, the prediction residual signal is coded in in the spatial domain directly. The transforms supported may comprise one or more of:

CT-II (or DCT-III), where DCT stands for Discrete Cosine Transform
DST-IV, where DST stands for Discrete Sine Transform
DCT-IV
DST-VII
Identity Transformation (IT)

The transforms may be separable transforms. Secondary transforms which may be non-separable transforms, might be applicable to a low frequency portion such as a sub-array extending from the DC component to some intermediate component other than the DC and highest frequency components. The encoder may decide on the usage of such secondary transform and select one for certain blocks and signal the decision to the decoder.

Now, returning to the adaptive quantization mode aspect, decoder and encoder may operate as follows. The decoder 20, see for example FIG. 8, may be configured to decode 140 residual levels 142, such as quantization levels of transform coefficients 100, as shown in FIG. 1, which represent a prediction residual 24", from a data stream 14, and sequentially, namely along a scan order such as 102 shown in FIG. 6, dequantize 150 the residual levels 142 by selecting 152 a quantizer out of a set 151 of default quantizers (e.g., set 0, set 1 in FIG. 1) depending on a current transition state (state), dequantizing 154 a current residual level using the quantizer to obtain a dequantized residual value 104, applying 156 a binary function, such as parity function, onto the current residual level to obtain a current residual level's characteristic 157, namely one or zero, and updating 158 the current transition state 160 depending on the current residual level's characteristic 157 using a transition table 106 to be used onto a next transition state 162 for a residual level to be dequantized next. The decoder 20 reconstructs 170 a media signal such as a picture or video using the dequantized residual values 104. The decoder 20 might select, depending on a quantization mode information 180 contained in the data stream 14, example of which are mentioned in section 5.1.3, one default transition table 106 out of a set 159 of default transition tables 106a,b,c as the transition table 106 to be used, each of which represents a surjective mapping (see, e.g., FIG. 10) from a domain of combinations 163 of the set of one or more transition states with the current residual level's characteristic 157 onto the set 161 of one or more transition states, wherein the default transition tables 106a,b,c differ in a cardinality l,m,n of the set of one or more transition states. Whatever default transition table 106a,b,c is selected as the transition table 106 to be used, the decoder 20 is configured to perform the selection 152 of the quantizer by mapping, using a first mapping 108 (see, e.g., section 5.2.4), a predetermined number of LSBs (e.g. one, i.e. only the LSB) of the current transition state onto the default quantizers, the predetermined number and the first mapping being equal whatever default transition table 106a,b,c is selected as the transition table 106 to be used (i.e. independent from the selected mode 180 or transition table 106a,b,c, respectively). The decoding 210 of the current residual level 142 from the data stream 14 may be done using context-adaptive binary arithmetic decoding of bins of a binarization of the current residual level. The bins may comprise a significance bin (sig_flag) indicative whether the current residual level is zero or non-zero, and the context for decoding this first bin of the current residual level may be selected by mapping, e.g., using a second mapping 110, as described in section 5.2.5.1, a further predetermined number (e.g. 2 which are grabbed out by "&3") of LSBs of the current transition state onto the first context, the second mapping being equal whatever default transition table 106a,b,c is selected as the transition table 106 to be used. Additionally or alternatively, the residual levels 142 are decoded from the data stream 14 by decoding 210 residual levels 142 relating to one picture block (e.g., the block 84 in FIG. 10 whose residual is obtained by re-transforming the transform coefficient block 112 shown in FIG. 6) prior to residual levels relating to another picture block, and sequentially decoding bins of a binarization of the residual levels 142 relating to the one picture block in one or more scans (see the passes in 114 in section 2.2.2) and using context-adaptive binary arithmetic decoding for a predetermined number (e.g. remRegBins) of leading bins of the bins of the binarization of the residual levels and using an equi-probability bypass mode for subsequent bins (k>=startIdxBypass) of the binarization of the residual levels, determine the binarization of a predetermined residual level 145 for which bins the predetermined number is exhausted (k>=startIdxBypass), by mapping, using a third mapping 118, a further predetermined number (e.g. 1) of LSBs of a transition state 220 manifesting itself for the predetermined residual level 145 onto a binarization parameter 302 (e.g. pos0) and performing the determination of the binarization of the predetermined residual level depending on the binarization parameter 302, the third mapping 118 being equal whatever default transition table 106a,b,c is selected as the transition table 106 to be used. The binarization for the predetermined residual level 145 depending on the binarization parameter 302 may be determined so that the binarization is a default binarization (e.g. Rice code) modified by re-directing one binarization code which depends on the binarization parameter, from being associated with a predetermined level to be associated with level zero and re-directing one or more binarization codes from being associated with one or more levels from zero to the predetermined level minus one, to be associated with one or more levels from one to the predetermined level.

The decoder 20 is then configured to reconstruct 170 the media signal using the dequantized residual values 104 by performing a prediction to obtain a predicted version of the media signal, and correcting the predicted version using the dequantized residual values 104, or to reconstruct the media signal using the dequantized residual values 104 by performing a prediction to obtain a predicted version of the media signal, and subjecting the dequantized residual values 104 to a reverse transformation to obtain a media residual signal, and correcting the predicted version using the media residual signal.

In the following, additional embodiments and aspects of the invention will be described which can be used individually or in combination with any of the features and functionalities and details described herein.

In accordance with a first aspect, a decoder (20) may be configured to

Decode (210) residual levels (142), which represent a prediction residual, from a data stream (14), sequentially dequantize (150) the residual levels (142) by selecting (152) a quantizer (153) out of a set (151) of default quantizers depending on a current transition state (220), dequantizing (154) a current residual level using the quantizer (153) to obtain a dequantized residual value (104), updating (158) the current transition state (220) depending on a current residual level's characteristic (157) obtained by an application (156) of a binary function onto the current residual level [e.g. parity], and depending on a quantization mode information (180) contained in the data stream (14), and reconstruct (170) a media signal using the dequantized residual values (104), wherein the current transition state (220) transitions, according to a surjective mapping which depends on the quantization mode information (180), from a domain of combinations (163) of a set (161) of one or more transition states with the current residual level's characteristic (157) onto the set (161) of one or more transition states, wherein a cardinality (l,m,n) of the set (161) of one or more transition states differs depending on the quantization mode information (180), and perform, whatever the quantization mode information (180) is [e.g. irrespective of, or independent from, the quantization mode information (180)], the selection (152) of the quantizer (153) by mapping, using a first mapping (200), a predetermined number of bits [e.g. one or more bits at one or more predetermined bit positions such as the LSB or the bit at the second but last significant bit position] of the current transition state (220) onto the default quantizers, the predetermined number and the first mapping (200) being equal whatever the quantization mode information (180) is.

In accordance with a second aspect when referring back to the first aspect, in the decoder (20), the predetermined number of bits may be one.

In accordance with a third aspect when referring back to the first or second aspect, the decoder (20) may be configured to select, depending on the quantization mode information (180), a selection of a transition table (106) to be used out of a set (159) of default transition tables (106a,b,c), and to manage the set (159) of default transition tables as different portions of a unified transition table within which, for each default transition table, each of the set (161) of one or more transition states is indexed using a state index different from state indices using which any other default transition table is indexed in the unified transition table [e.g. the transition states of the default transition tables in the different portions of the unified transition table, are disjoint from one default transition table to another].

In accordance with a fourth aspect when referring back to the third aspect, the decoder (20) may be configured to perform the updating (158) the current transition state (220) by looking-up in the unified transition table an entry which corresponds to a combination of the current residual level's characteristic (157) and the current transition state (220).

In accordance with a fifth aspect when referring back to the third or fourth aspect, in the decoder (20), the quantization mode information (180) may comprise a syntax element in the data stream (14) indicative of a starting transition state for use in dequantizing a, in a dequantization order [e.g. along which the sequential dequantization is performed], first residual level, so that the syntax element indicates the transition table (106) to be used out of the default transition tables by virtue of fitting to a state index only used in the portion of the unified transition table corresponding to the transition table (106) to be used.

In accordance with a sixth aspect when referring back to any of the first to fifth aspects, in the decoder (20), the set (151) of default quantizers may consist of
 a first default quantizer (151$_1$) comprising as reconstruction levels even integer multiples of a quantization step size (144), and
 a second default quantizer (151$_2$) comprising as reconstruction levels odd integer multiples of the quantization step size (144) and zero.

In accordance with a seventh aspect when referring back to any of the first to sixth aspects, the decoder (20) may be configured to
 decode the current residual level from the data stream (14) using context-adaptive binary arithmetic decoding of bins of a binarization of the current residual level, the bins comprising a significance bin (92) indicative whether the current residual level is zero or non-zero,
 select a first context (242) for decoding the first bin (92) of the current residual level depending on a value (230) obtained by mapping, using a second mapping (202), a further predetermined number of bits of the current transition state (220) onto the said value, the second mapping (144) being equal whatever the quantization mode information (180) is.

In accordance with an eighth aspect when referring back to the seventh aspect, in the decoder (20), the further predetermined number of bits may be two.

In accordance with a ninth aspect when referring back to any of the first to eighth aspects, in the decoder (20), the media signal may be a video and the decoder (20) may be configured to decode (210) the residual levels (142) from the data stream (14) by
 decoding residual levels relating to one picture block (84) prior to residual levels relating to another picture block (84),
 sequentially decoding bins of a binarization of the residual levels relating to the one picture block (84) in one or more scans and using context-adaptive binary arithmetic decoding for a predetermined number of leading bins of the bins of the binarization of the residual levels and using an equi-probability bypass mode for subsequent bins of the binarization of the residual levels,
 determine the binarization of a predetermined residual level for which the predetermined number of bins is exhausted, by mapping, using a third mapping, a further predetermined number of bits [e.g. one or more bits at one or more predetermined bit positions such as the LSB or the bit at the second but last significant bit position] of a transition state onto a binarization parameter (302) and performing the determination of the binarization of the predetermined residual level depending on the binarization parameter (302), the third mapping being equal whatever the quantization mode information (180) is.

In accordance with a tenth aspect when referring back to the ninth aspect, the decoder (20) may be configured to determine the binarization for the predetermined residual level depending on the binarization parameter (302) so that the binarization is a default binarization modified by re-directing one binarization code which depends on the binarization parameter (302), from being associated with a predetermined level to be associated with level zero and re-directing one or more binarization codes from being associated with one or more levels from zero to the predetermined level minus one, to be associated with one or more levels from one to the predetermined level.

In accordance with an eleventh aspect when referring back to the ninth or tenth aspect, in the decoder (20), the further predetermined number of bits may be one.

In accordance with a twelfth aspect when referring back to the ninth aspect, in the decoder (20), depending on the quantization mode information (180), the surjective mapping and the cardinality of the set (161) of one or more transition states may be selectable between two or more of the cardinality of the set (161) of one or more transition states is one,
the cardinality of the set (161) of one or more transition states is four,
the cardinality of the set (161) of one or more transition states is eight.

In accordance with a thirteenth aspect when referring back to any of the first to twelfth aspects, in the decoder (20), the media signal may be a video and the decoder (20) may be configured to read the quantization mode information (180) which controls the updating (158) in a manner of one of
for the video,
picture block (84) wise,
on a per picture basis,
on a per slice basis, and
on a per picture sequence basis.

In accordance with a fourteenth aspect when referring back to any of the first to thirteenth aspects, in the decoder (20), the media signal may be a video and the quantization mode information (180) may comprise a first syntax element in the data stream (14) which indicates for the video or a portion of the video whether the update (158) is controlled within the video or the portion of the video via a second syntax element of the quantization mode information (180) in the data stream (14), or which surjective mapping and which cardinality of the set (161) of one or more transition states is to be selected for the update (158).

In accordance with a fifteenth aspect when referring back to the fourteenth aspect, in the decoder (20), the first syntax element may be contained in the data stream (14) within
a video parameter set with the portion being the video and the second syntax element controlling the update (158) in units of
sequence of pictures,
pictures,
tiles,
slices,
coding tree blocks [e.g. at units of which, for instance, one picture is uniformly pre-subdivided before each coding tree block is partitioned into coding blocks by way of recursive multi-tree subdivisoning], coding blocks the intra/inter mode decision is made],
coding blocks [e.g. at units of which, for instance, the intra/inter mode decision is made], or residual transform blocks,
a sequence parameter set with the portion being a sequence of pictures and the second syntax element controlling the update (158) in units of
pictures,
tiles,
slices,
coding tree blocks [e.g. at units of which, for instance, one picture is uniformly pre-subdivided before each coding tree block is partitioned into coding blocks by way of recursive multi-tree subdivisoning], coding blocks the intra/inter mode decision is made],
coding blocks [e.g. at units of which, for instance, the intra/inter mode decision is made], or residual transform blocks,
a picture parameter set with the portion being one or more pictures and the second syntax element controlling the update (158) in units of
pictures,
tiles,
slices,
coding tree blocks [e.g. at units of which, for instance, one picture is uniformly pre-subdivided before each coding tree block is partitioned into coding blocks by way of recursive multi-tree subdivisoning], coding blocks the intra/inter mode decision is made],
coding blocks [e.g. at units of which, for instance, the intra/inter mode decision is made], or residual transform blocks, or
a picture header with the portion being one picture and the second syntax element controlling the update (158) in units of
tiles,
slices,
coding tree blocks [e.g. at units of which, for instance, one picture is uniformly pre-subdivided before each coding tree block is partitioned into coding blocks by way of recursive multi-tree subdivisoning], coding blocks the intra/inter mode decision is made],
coding blocks [e.g. at units of which, for instance, the intra/inter mode decision is made], or residual transform blocks, or
a parameter set with the portion being one coding tree block and the second syntax element controlling the update (158) in units of
coding blocks [e.g. at units of which, for instance, the intra/inter mode decision is made], or residual transform blocks.

In accordance with a sixteenth aspect when referring back to any of the first to fifteenth aspects, in the decoder (20), the media signal may be a color video and the decoder (20) may be configured to use a different version for the set (151) of default quantizers for different colour components.

In accordance with a seventeenth aspect when referring back to any of the first to sixteenth aspects, in the decoder (20), the binary function may be the parity.

In accordance with an eighteenth sixth aspect when referring back to any of the first to seventeenth aspects, the decoder (20) may be configured to reconstruct (170) the media signal using the dequantized residual values (104) by
performing a prediction to obtain a predicted version of the media signal, and
correcting the predicted version using the dequantized residual values (104).

In accordance with a nineteenth aspect when referring back to any of the first to eighteenth aspects, the decoder (20) may be configured to reconstruct (170) the media signal using the dequantized residual values (104) by
performing a prediction to obtain a predicted version of the media signal,
subjecting the dequantized residual values (104) to a reverse transformation to obtain a media residual signal, and
correcting the predicted version using the media residual signal.

In accordance with a twentieth aspect, an encoder may be configured to
predictively encode a media signal to obtain a residual signal,
sequentially quantize residual values which represent the residual signal to obtain residual levels (142) by
selecting (152) a quantizer (153) out of a set (151) of default quantizers depending on a current transition state (220),
quantizing a current residual value using the quantizer (153) to obtain a current residual level,
updating (158) the current transition state (220) depending on a current residual level's characteristic (157) obtained by an application (156) of a binary function onto the current residual level [e.g. parity], and depending on a quantization mode information (180) transmitted in the data stream (14), and encode the residual levels (142) into the data stream (14), wherein the current transition state (220) transitions, according to a surjective mapping which depends on the quantization mode information (180), from a domain of combinations (163) of a set (161) of one or more transition states with the current residual level's characteristic (157) onto the set (161) of one or more transition states, wherein a cardinality of the set (161) of one or more transition states differs depending on the quantization mode information (180), and perform, whatever the quantization mode information (180) is [e.g. irrespective of, or independent from, the quantization mode information (180), the selection (152) of the quantizer (153) by mapping, using a first mapping (200), a predetermined number of bits [e.g. one or more bits at one or more predetermined bit positions such as the LSB or the bit at the second but last significant bit position] of the current transition state (220) onto the default quantizers, the predetermined number and the first mapping (200) being equal whatever the quantization mode information (180) is.

In accordance with a twenty-first aspect when referring back to the twentieth aspect, in the encoder, the predetermined number of bits may be one.

In accordance with a twenty-second aspect when referring back to the twentieth or twenty-first aspect, the encoder may be configured to select, depending on the quantization mode information (180), a selection of a transition table (106) to be used out of a set (159) of default transition tables, and to manage the set (159) of default transition tables as different portions of a unified transition table within which, for each default transition table, each of the set (161) of one or more transition states is indexed using a state index different from state indices using which any other default transition table is indexed in the unified transition table [e.g. the transition states of the default transition tables in the different portions of the unified transition table, are disjoint from one default transition table to another].

In accordance with a twenty-third aspect when referring back to the twenty-second aspect, the encoder may be configured to perform the updating (158) the current transition state (220) by looking-up in the unified transition table an entry which corresponds to a combination of the current residual level's characteristic (157) and the current transition state (220).

In accordance with a twenty-fourth aspect when referring back to the twenty-second or twenty-third aspect, the encoder may be configured to encode as the quantization mode information (180) a syntax element into the data stream (14) which is indicative of a starting transition state for use in quantizing a, in a quantization order [e.g. along which the sequential dequantization is performed], first residual value, so that the syntax element indicates the transition table (106) to be used out of the default transition tables by virtue of fitting to a state index only used in the portion of the unified transition table corresponding to the transition table (106) to be used.

In accordance with a twenty-fifth aspect when referring back to any of the twentieth to twenty-fourth aspects, in the encoder, the set (151) of default quantizers consists of a first default quantizer ($151_1$) comprising as encoding levels even integer multiples of a quantization step size (144), and a second default quantizer ($151_2$) comprising as encoding levels odd integer multiples of the quantization step size (144) and zero.

In accordance with a twenty-sixth aspect when referring back to any of the twentieth to twenty-fifth aspects, the encoder may be configured to encode the current residual level into the data stream (14) using context-adaptive binary arithmetic encoding of bins of a binarization of the current residual level, the bins comprising a significance bin (92) indicative whether the current residual level is zero or non-zero, select a first context (242) for encoding the first bin (92) of the current residual level depending on a value (230) obtained by mapping, using a second mapping (144), a further predetermined number of bits of the current transition state (220) onto the said value, the second mapping (144) being equal whatever the quantization mode information (180) is.

In accordance with a twenty-seventh aspect when referring back to the twenty-sixth aspect, in the encoder, the further predetermined number of bits may be two.

In accordance with a twenty-eighth aspect when referring back to any of the twentieth to twenty-seventh aspects, in the encoder, the media signal may be a video and the encoder may be configured to encode the residual levels (142) into the data stream (14) by encoding residual levels relating to one picture block (84) prior to residual levels relating to another picture block (84), sequentially encoding bins of a binarization of the residual levels relating to the one picture block (84) in one or more scans and using context-adaptive binary arithmetic encoding for a predetermined number of leading bins of the bins of the binarization of the residual levels and using a equi-probability bypass mode for subsequent bins of the binarization of the residual levels, determine the binarization of a predetermined residual level for which the predetermined number of bins is exhausted, by mapping, using a third mapping, a further predetermined number of bits [e.g. one or more bits at one or more predetermined bit positions such as the LSB or the bit at the second but last significant bit position] of a transition state onto a binarization parameter (302) and performing the determination of the binarization of the predetermined residual level depending on the binarization parameter (302), the third mapping being equal whatever the quantization mode information (180) is.

In accordance with a twenty-ninth aspect when referring back to the twenty-eighth aspect, the encoder may be configured to determine the binarization for the predetermined residual level depending on the binarization parameter (302) so that the binarization is a default binarization modified by re-directing one binarization code which depends on the binarization parameter (302), from being associated with a predetermined level to be associated with level zero and re-directing one or more binarization codes from being associated with one or more levels from zero to the predetermined level minus one, to be associated with one or more levels from one to the predetermined level.

In accordance with a thirtieth aspect when referring back to the twenty-eighth or twenty-ninth aspect, in the encoder, the further predetermined number of bits may be one.

In accordance with a thirty-first aspect when referring back to the twenty-eighth aspect, in the encoder, depending on the quantization mode information (180), the surjective mapping and the cardinality of the set (161) of one or more transition states may be selectable between two or more of
- the cardinality of the set (161) of one or more transition states is one,
- the cardinality of the set (161) of one or more transition states is four,
- the cardinality of the set (161) of one or more transition states is eight.

In accordance with a thirty-second aspect when referring back to any of the twentieth to thirty-first aspects, in the encoder, the media signal may be a video and the encoder may be configured to write the quantization mode information (180) so as to control the updating (158) in a manner of one of
- for the video,
- picture block (84) wise,
- on a per picture basis,
- on a per slice basis, and
- on a per picture sequence basis.

In accordance with a thirty-third aspect when referring back to any of the twentieth to thirty-second aspects, in the encoder, the media signal may be a video and the quantization mode information (180) may comprise a first syntax element in the data stream (14) which indicates for the video or a portion of the video whether update (158) is controlled within the video or the portion of the video via a second syntax element of the quantization mode information (180) in the data stream (14), or which surjective mapping and which cardinality of the set (161) of one or more transition states is to be selected for the update (158).

In accordance with a thirty-fourth aspect when referring back to the thirty-third aspect, in the encoder, the first syntax element may be contained in the data stream (14) within
- a video parameter set with the portion being the video and the second syntax element controlling the update (158) in units of
  - sequence of pictures,
  - pictures,
  - tiles,
  - slices,
  - coding tree blocks [e.g. at units of which, for instance, one picture is uniformly pre-subdivided before each coding tree block is partitioned into coding blocks by way of recursive multi-tree subdivisoning], coding blocks the intra/inter mode decision is made],
  - coding blocks [e.g. at units of which, for instance, the intra/inter mode decision is made], or residual transform blocks,
- a sequence parameter set with the portion being a sequence of pictures and the second syntax element controlling the update (158) in units of
  - pictures,
  - tiles,
  - slices,
  - coding tree blocks [e.g. at units of which, for instance, one picture is uniformly pre-subdivided before each coding tree block is partitioned into coding blocks by way of recursive multi-tree subdivisoning], coding blocks the intra/inter mode decision is made],
  - coding blocks [e.g. at units of which, for instance, the intra/inter mode decision is made], or residual transform blocks,
- a picture parameter set with the portion being one or more pictures and the second syntax element controlling the update (158) in units of
  - pictures,
  - tiles,
  - slices,
  - coding tree blocks [e.g. at units of which, for instance, one picture is uniformly pre-subdivided before each coding tree block is partitioned into coding blocks by way of recursive multi-tree subdivisoning], coding blocks the intra/inter mode decision is made],
  - coding blocks [e.g. at units of which, for instance, the intra/inter mode decision is made], or residual transform blocks, or
- a picture header with the portion being one picture and the second syntax element controlling the update (158) in units of
  - tiles,
  - slices,
  - coding tree blocks [e.g. at units of which, for instance, one picture is uniformly pre-subdivided before each coding tree block is partitioned into coding blocks by way of recursive multi-tree subdivisoning], coding blocks the intra/inter mode decision is made],
  - coding blocks [e.g. at units of which, for instance, the intra/inter mode decision is made], or residual transform blocks, or
- a parameter set with the portion being one coding tree block and the second syntax element controlling the update (158) in units of
  - coding blocks [e.g. at units of which, for instance, the intra/inter mode decision is made], or residual transform blocks.

In accordance with a thirty-fifth aspect when referring back to any of the twentieth to thirty-fourth aspects, in the encoder, the media signal may be a color video and the encoder may be configured to use a different version for the set (151) of default quantizers for different colour components.

In accordance with a thirty-sixth aspect when referring back to any of the twentieth to thirty-fifth aspects, in the encoder, the binary function may be the parity.

In accordance with a thirty-seventh aspect when referring back to any of the twentieth to thirty-sixth aspects, the encoder may be configured to predictively encode a media signal to obtain a residual signal by
- performing a prediction to obtain a predicted version of the media signal and the residual signal.

In accordance with a thirty-eighth aspect when referring back to any of the twentieth to thirty-seventh aspects, the encoder may be configured to predictively encode a media signal to obtain a residual signal by
- performing a prediction to obtain a predicted version of the media signal and the residual signal, subjecting the residual signal to a forward transformation.

In accordance with a thirty-ninth aspect, a method may have the steps of:
- decoding residual levels, which represent a prediction residual, from a data stream, sequentially dequantizing the residual levels by
- selecting a quantizer out of a set of default quantizers depending on a current transition state, dequantizing a current residual level using the quantizer to obtain a dequantized residual value, updating the current transition state depending on a current residual level's characteristic obtained by an application of a binary function onto the current residual level [e.g. parity], and depending on a quantization mode information contained in the data stream, and reconstructing a media signal using the dequantized residual values, wherein the current transition state transitions, according to a surjective mapping which depends on the quantization mode information, from a domain of combinations of a set of one or more transition states with the current residual level's characteristic onto the set of one or more transition states, wherein a cardinality of the set of one or more transition states differs depending on the quantization mode information, and performing, whatever the quantization mode information is [e.g. irrespective of, or independent from, the quantization mode information, the selection of the quantizer by mapping, using a first mapping, a predetermined number of bits [e.g. one or more bits at one or more predetermined bit positions such as the LSB or the bit at the second but last significant bit position] of the current transition state onto the default quantizers, the predetermined number and the first mapping being equal whatever the quantization mode information is.

In accordance with a fortieth aspect, a method may have the steps of:

predictively encoding a media signal to obtain a residual signal, sequentially quantizing residual values which represent the residual signal to obtain residual levels by selecting a quantizer out of a set of default quantizers depending on a current transition state, quantizing a current residual value using the quantizer to obtain a current residual level, updating the current transition state depending on a current residual level's characteristic obtained by an application of a binary function onto the current residual level [e.g. parity], and depending on a quantization mode information transmitted in the data stream, and encoding the residual levels into the data stream, wherein the current transition state transitions, according to a surjective mapping which depends on the quantization mode information, from a domain of combinations of a set of one or more transition states with the current residual level's characteristic onto the set of one or more transition states, wherein a cardinality of the set of one or more transition states differs depending on the quantization mode information, and performing, whatever the quantization mode information is [e.g. irrespective of, or independent from, the quantization mode information, the selection of the quantizer by mapping, using a first mapping, a predetermined number of bits [e.g. one or more bits at one or more predetermined bit positions such as the LSB or the bit at the second but last significant bit position] of the current transition state onto the default quantizers, the predetermined number and the first mapping being equal whatever the quantization mode information is.

In accordance with a forty-first aspect, a data stream may be encoded by a method according to the fortieth aspect.

In accordance with a forty-second aspect, a computer program may have a program code for executing a method according to the thirty-ninth or fortieth aspect, when the program runs on one or several computers.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. Decoder configured to decode residual levels, which represent a prediction residual, from a data stream, sequentially dequantize the residual levels by selecting a quantizer out of a set of default quantizers depending on a current transition state, dequantizing a current residual level using the quantizer to acquire a dequantized residual value, applying a binary function onto the current residual level to acquire a current residual level's characteristic, and updating the current transition state depending on the current residual level's characteristic using a transition table to be used, reconstruct a media signal using the dequantized residual values, select, depending on a quantization mode information comprised by the data stream, one default transition table out of a set of default transition tables as the transition table to be used, each of which represents a surjective mapping from a domain of combinations of the set of transition states with the current residual level's characteristic onto the set of transition states, wherein the default transition tables differ in a cardinality of the set of transition states, wherein the cardinality is four or larger, and perform the selection of the quantizer by mapping, using a first mapping, a predetermined number of bits of the current transition state onto the default quantizers, wherein the predetermined number and the first mapping do not change whatever default transition table is selected as the transition table to be used.

2. Decoder of claim 1, wherein the predetermined number of bits is one.

3. Decoder of claim 1, wherein the decoder is configured to manage the set of default transition tables as different portions of a unified transition table within which, for each default transition table, each of the set of transition states is indexed using a state index different from state indices using which any other default transition table is indexed in the unified transition table.

4. Decoder of claim 3, wherein the decoder is configured to perform the updating the current transition state by looking-up in the unified transition table an entry which corresponds to a combination of the current residual level's characteristic and the current transition state.

5. Decoder of claim 3, wherein the quantization mode information comprises a syntax element in the data stream indicative of a starting transition state for use in dequantizing a, in a dequantization order, first residual level, so that the syntax element indicates the transition table to be used out of the default transition tables by virtue of fitting to a state index only used in the portion of the unified transition table corresponding to the transition table to be used.

6. Decoder of claim 1, wherein the set of default quantizers comprises a first default quantizer comprising as reconstruction levels even integer multiples of a quantization step size, and a second default quantizer comprising as reconstruction levels odd integer multiples of the quantization step size and zero.

7. Decoder of claim 1, configured to

Decode the current residual level from the data stream using context-adaptive binary arithmetic decoding of bins of a binarization of the current residual level, the bins comprising a significance bin indicative whether the current residual level is zero or non-zero, select a first context for decoding the first bin of the current residual level depending on a value acquired by mapping, using a second mapping, a further predetermined number of bits of the current transition state onto the said value, the second mapping being equal whatever default transition table is selected as the transition table to be used.

8. Decoder of claim 7, wherein the further predetermined number of bits is two.

9. Decoder of claim 1, the media signal is a video and the decoder is configured to Decode the residual levels from the data stream by decoding residual levels relating to one picture block prior to residual levels relating to another picture block, sequentially decoding bins of a binarization of the residual levels relating to the one picture block in one or more scans and using context-adaptive binary arithmetic decoding for a predetermined number of leading bins of the bins of the binarization of the residual levels and using an equi-probability bypass mode for subsequent bins of the binarization of the residual levels, determine the binarization of a predetermined residual level for which the predetermined number of bins is exhausted, by mapping, using a third mapping, a further predetermined number of bits of a transition state onto a binarization parameter and performing the determination of the binarization of the predetermined residual level depending on the binarization parameter.

10. Decoder of claim 9, configured to determine the binarization for the predetermined residual level depending on the binarization parameter so that the binarization is a default binarization modified by re-directing one binarization code which depends on the binarization parameter, from being associated with a predetermined level to be associated with level zero and re-directing one or more binarization codes from being associated with one or more levels from zero to the predetermined level minus one, to be associated with one or more levels from one to the predetermined level.

11. Decoder of claim 9, wherein the further predetermined number of bits is one.

12. Decoder of claim 1, wherein the set of default transition tables comprises a first default transition table for which the cardinality of the set of transition states is four, and a second default transition table for which the cardinality of the set of transition states is eight.

13. Decoder of claim 1, wherein the media signal is a video and the decoder is configured to read the quantization mode information from the data stream and perform the selection of the one default transition table out of the set of default transition tables in a manner of one of once for the video, picture block wise, on a per picture basis, on a per slice basis, and on a per picture sequence basis.

14. Decoder of claim 1, wherein the media signal is a video and the quantization mode information comprises a first syntax element in the data stream which indicates for the video or a portion of the video whether the selection of the one default transition table out of the set of default transition tables is controlled within the video or the portion of the video via a second syntax element of the quantization mode information in the data stream, or which of the set of default transition tables is to be selected as the one default transition table for the portion of the video.

15. Decoder of claim 14, wherein the first syntax element is comprised by the data stream within a video parameter set with the portion being the video and the second syntax element controlling the selection of the one default transition table out of the set of default transition tables in units of sequence of pictures, pictures, tiles, slices, coding tree blocks, coding blocks, or residual transform blocks, a sequence parameter set with the portion being a sequence of pictures and the second syntax element controlling the selection of the one default transition table out of the set of default transition tables in units of pictures, tiles, slices, coding tree blocks, coding blocks, or residual transform blocks, a picture parameter set with the portion being one or more pictures and the second syntax element controlling the selection of the one default transition table out of the set of default transition tables in units of pictures, tiles, slices, coding tree blocks, coding blocks, or residual transform blocks, or a picture header with the portion being one picture and the second syntax element controlling the selection of the one default transition table out of the set of default transition tables in units of tiles, slices, coding tree blocks, coding blocks, or residual transform blocks, or a parameter set with the portion being one coding tree block and the second syntax element controlling the selection of the one default transition table out of the set of default transition tables in units of coding blocks, or residual transform blocks.

16. Decoder of claim 1, wherein the media signal is a color video and the decoder is configured to use a different version for the set of default quantizers for different colour components.

17. Decoder of claim 1, wherein the binary function is the parity.

18. Decoder of claim 1, configured to reconstruct the media signal using the dequantized residual values by
  performing a prediction to acquire a predicted version of the media signal,
  correcting the predicted version using the dequantized residual values.

19. Decoder of claim 1, configured to reconstruct the media signal using the dequantized residual values by
  performing a prediction to acquire a predicted version of the media signal,
  subjecting the dequantized residual values to a reverse transformation to acquire a media residual signal, and
  correcting the predicted version using the media residual signal.

20. Encoder configured to
  predictively encode a media signal to acquire a residual signal,
  sequentially quantize residual values which represent the residual signal to acquire residual levels by
    selecting a quantizer out of a set of default quantizers depending on a current transition state,
    quantizing a current residual value using the quantizer to acquire a current residual level,
    applying a binary function onto the current residual level to acquire a current residual level's characteristic, and
    updating the current transition state depending on the current residual level's characteristic using a transition table to be used,
  encode the residual levels into the data stream,
  select, depending on a quantization mode information transmitted in the data stream, one default transition table out of a set of default transition tables as the transition table to be used, each of which represents a surjective mapping from a domain of combinations of the set of transition states with the current residual level's characteristic onto the set of transition states, wherein the default transition tables differ in a cardinality of the set of transition states, wherein the cardinality is four or larger, and
  perform the selection of the quantizer by mapping, using a first mapping, a predetermined number of bits of the current transition state onto the default quantizers, wherein the predetermined number and the first mapping do not change whatever default transition table is selected as the transition table to be used.

21. Method, comprising:
  decoding residual levels, which represent a prediction residual, from a data stream, sequentially dequantizing the residual levels by
    selecting a quantizer out of a set of default quantizers depending on a current transition state,
    dequantizing a current residual level using the quantizer to acquire a dequantized residual value,
    applying a binary function onto the current residual level to acquire a current residual level's characteristic, and
    updating the current transition state depending on the current residual level's characteristic using a transition table to be used,
  reconstructing a media signal using the dequantized residual values,
  selecting, depending on a quantization mode information comprised by the data stream, one default transition table out of a set of default transition tables as the transition table to be used, each of which represents a surjective mapping from a domain of combinations of the set of transition states with the current residual level's characteristic onto the set of transition states, wherein the default transition tables differ in a cardinality of the set of transition states, wherein the cardinality is four or larger, and
  performing the selection of the quantizer by mapping, using a first mapping, a predetermined number of bits of the current transition state onto the default quantizers, wherein the predetermined number and the first mapping do not change whatever default transition table is selected as the transition table to be used.

22. Method, comprising:
  predictively encoding a media signal to acquire a residual signal,
  sequentially quantizing residual values which represent the residual signal to acquire residual levels by
    selecting a quantizer out of a set of default quantizers depending on a current transition state,
    quantizing a current residual value using the quantizer to acquire a current residual level,
    applying a binary function onto the current residual level to acquire a current residual level's characteristic, and
    updating the current transition state depending on the current residual level's characteristic using a transition table to be used,
  encoding the residual levels into the data stream,
  selecting, depending on a quantization mode information transmitted in the data stream, one default transition table out of a set of default transition tables as the transition table to be used, each of which represents a surjective mapping from a domain of combinations of the set of transition states with the current residual level's characteristic onto the set of transition states, wherein the default transition tables differ in a cardinality of the set of transition states, wherein the cardinality is four or larger, and
  performing the selection of the quantizer by mapping, using a first mapping, a predetermined number of bits of the current transition state onto the default quantizers, wherein the predetermined number and the first mapping do not change whatever default transition table is selected as the transition table to be used.

23. Data stream encoded by a method comprising:
  predictively encoding a media signal to acquire a residual signal,
  sequentially quantizing residual values which represent the residual signal to acquire residual levels by
    selecting a quantizer out of a set of default quantizers depending on a current transition state,
    quantizing a current residual value using the quantizer to acquire a current residual level,
    applying a binary function onto the current residual level to acquire a current residual level's characteristic, and
    updating the current transition state depending on the current residual level's characteristic using a transition table to be used,
  encoding the residual levels into the data stream,
  selecting, depending on a quantization mode information transmitted in the data stream, one default transition table out of a set of default transition tables as the transition table to be used, each of which represents a surjective mapping from a domain of combinations of the set of transition states with the current residual level's characteristic onto the set of transition states, wherein the default transition tables differ in a cardinality of the set of transition states, wherein the cardinality is four or larger, and performing the selection of the quantizer by mapping, using a first mapping, a predetermined number of bits of the current transition state onto the default quantizers, wherein the predetermined number and the first mapping do not change whatever default transition table is selected as the transition table to be used.

24. A non-transitory digital storage medium having a computer program stored thereon to perform the method comprising:

decoding residual levels, which represent a prediction residual, from a data stream, sequentially dequantizing the residual levels by
- selecting a quantizer out of a set of default quantizers depending on a current transition state,
- dequantizing a current residual level using the quantizer to acquire a dequantized residual value,
- applying a binary function onto the current residual level to acquire a current residual level's characteristic, and
- updating the current transition state depending on the current residual level's characteristic using a transition table to be used, reconstructing a media signal using the dequantized residual values, selecting, depending on a quantization mode information comprised by the data stream, one default transition table out of a set of default transition tables as the transition table to be used, each of which represents a surjective mapping from a domain of combinations of the set of transition states with the current residual level's characteristic onto the set of transition states, wherein the default transition tables differ in a cardinality of the set of transition states, wherein the cardinality is four or larger, and performing the selection of the quantizer by mapping, using a first mapping, a predetermined number of bits of the current transition state onto the default quantizers, wherein the predetermined number and the first mapping do not change whatever default transition table is selected as the transition table to be used, when said computer program is run by a computer.

25. A non-transitory digital storage medium having a computer program stored thereon to perform the method comprising:

predictively encoding a media signal to acquire a residual signal, sequentially quantizing residual values which represent the residual signal to acquire residual levels by
- selecting a quantizer out of a set of default quantizers depending on a current transition state,
- quantizing a current residual value using the quantizer to acquire a current residual level,
- applying a binary function onto the current residual level to acquire a current residual level's characteristic, and
- updating the current transition state depending on the current residual level's characteristic using a transition table to be used, encoding the residual levels into the data stream, selecting, depending on a quantization mode information transmitted in the data stream, one default transition table out of a set of default transition tables as the transition table to be used, each of which represents a surjective mapping from a domain of combinations of the set of transition states with the current residual level's characteristic onto the set of transition states, wherein the default transition tables differ in a cardinality of the set of transition states, wherein the cardinality is four or larger, and performing the selection of the quantizer by mapping, using a first mapping, a predetermined number of bits of the current transition state onto the default quantizers, wherein the predetermined number and the first mapping do not change whatever default transition table is selected as the transition table to be used, when said computer program is run by a computer.

* * * * *